(12) United States Patent
Ko et al.

(10) Patent No.: US 12,488,856 B2
(45) Date of Patent: Dec. 2, 2025

(54) MEMORY DEVICE, OPERATION METHOD OF MEMORY DEVICE, AND OPERATION METHOD OF TEST DEVICE CONFIGURED TO TEST MEMORY DEVICE

(71) Applicant: SAMSUNG ELECTRONICS CO., LTD., Suwon-si (KR)

(72) Inventors: Kuihan Ko, Suwon-si (KR); Sang-Won Park, Suwon-si (KR); Won-Taeck Jung, Suwon-si (KR); Heewon Son, Suwon-si (KR); Bongsoon Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 167 days.

(21) Appl. No.: 18/395,010

(22) Filed: Dec. 22, 2023

(65) Prior Publication Data
US 2024/0233857 A1    Jul. 11, 2024

(30) Foreign Application Priority Data

Jan. 11, 2023 (KR) .................. 10-2023-0004320
Apr. 4, 2023 (KR) .................. 10-2023-0044107

(51) Int. Cl.
*G11C 29/56* (2006.01)

(52) U.S. Cl.
CPC .. *G11C 29/56004* (2013.01); *G11C 29/56012* (2013.01); *G11C 29/56016* (2013.01); *G11C 2029/5602* (2013.01)

(58) Field of Classification Search
CPC ........ G11C 29/56004; G11C 29/56012; G11C 29/56016; G11C 2029/5602; G11C 29/021; G11C 29/12015; G11C 29/14; G11C 29/46
USPC ............................................ 365/201, 230.06
See application file for complete search history.

(56) References Cited

U.S. PATENT DOCUMENTS

| | | |
|---|---|---|
| 5,764,573 A | 6/1998 | Iketani et al. |
| 5,892,776 A | 4/1999 | Kumakura |
| 6,940,777 B2 | 9/2005 | Oosihi |
| 2002/0181296 A1* | 12/2002 | Jones ............... G11C 29/02 365/194 |
| 2005/0135145 A1 | 6/2005 | Lee et al. |

(Continued)

FOREIGN PATENT DOCUMENTS

| | | |
|---|---|---|
| JP | 2001-99886 A | 4/2001 |
| JP | 2002-323546 A | 11/2002 |
| JP | 4557526 B2 | 10/2010 |

*Primary Examiner* — Michael T Tran
(74) *Attorney, Agent, or Firm* — Sughrue Mion, PLLC

(57) ABSTRACT

A memory device includes a memory cell array, a reference generating circuit, a row decoding circuit that is connected to the memory cell array through word lines, a page buffer circuit that is connected to the memory cell array through bit lines, a data input/output circuit that is connected to the page buffer circuit through a data line, a buffer circuit, a control logic circuit that performs logic sequences, based on the internal clock signal and the internal power, and a test mode circuit. When the memory device enters a test mode, the test mode circuit disables a part of components of the reference generating circuit. In the test mode, the control logic circuit performs the logic sequences by using an external clock signal provided from an external device.

20 Claims, 13 Drawing Sheets

(56) References Cited

U.S. PATENT DOCUMENTS

| | | | | |
|---|---|---|---|---|
| 2012/0017118 A1* | 1/2012 | Barakat | ............... | G06F 11/221 |
| | | | | 714/37 |
| 2014/0365839 A1* | 12/2014 | Iwagami | .......... | G01R 31/31724 |
| | | | | 714/727 |
| 2022/0113889 A1* | 4/2022 | Park | ................. | G11C 29/022 |

* cited by examiner

MEMORY DEVICE, OPERATION METHOD OF MEMORY DEVICE, AND OPERATION METHOD OF TEST DEVICE CONFIGURED TO TEST MEMORY DEVICE

CROSS-REFERENCE TO RELATED APPLICATIONS

This application claims priority under 35 U.S.C. § 119 to Korean Patent Application No. 10-2023-0004320 filed on Jan. 11, 2023, and Korean Patent Application No. 10-2023-0044107 filed on Apr. 4, 2023, in the Korean Intellectual Property Office, the disclosures of each of which being incorporated by reference herein in their entireties.

BACKGROUND

Embodiments relate to a semiconductor memory, and more particularly, relate to a memory device, an operation method of the memory device, and an operation method of a test device configured to test the memory device.

A semiconductor memory is classified as a volatile memory, which loses data stored therein when a power is turned off, such as a static random access memory (SRAM) or a dynamic random access memory (DRAM) or a non-volatile memory, which retains data stored therein even when a power is turned off, such as a flash memory, a phase-change RAM (PRAM), a magnetic RAM (MRAM), a resistive RAM (RRAM), or a ferroelectric RAM (FRAM).

A flash memory is being widely used as a high-capacity storage medium. As the degree of integration of the flash memory is improved, nowadays, various defects occur in the flash memory. Accordingly, to detect various defects or faults of the flash memory, various test operations are performed in the process of manufacturing the flash memory.

SUMMARY

It is an aspect to provide a memory device with improved test accuracy, an operation method of the memory device, and an operation method of a test device configured to test the memory device.

According to an aspect of one or more embodiments, a memory device may include a memory cell array; a reference generating circuit configured to generate, by using an external power provided from an external device, a plurality of operating voltages, an internal clock signal, and an internal power; a row decoding circuit connected to the memory cell array through word lines, and configured to control the word lines by using the plurality of operating voltages; a page buffer circuit connected to the memory cell array through bit lines; a data input/output circuit connected to the page buffer circuit through data lines; a buffer circuit configured to receive a command and an address from the external device; a control logic circuit configured to perform a plurality of logic sequences for controlling the row decoding circuit, the page buffer circuit, the data input/output circuit, and the buffer circuit, based on the internal clock signal and the internal power that is generated using the external power; and a test mode circuit, wherein, when the memory device enters a test mode, the test mode circuit disables at least a part of the reference generating circuit such that the plurality of operating voltages and the internal clock signal are not generated and provides an external clock signal received from the external device to the control logic circuit, and wherein, in the test mode, the control logic circuit performs the plurality of logic sequences by using the external clock signal and the internal power.

According to another aspect of one or more embodiments, an operation method of a memory device may include entering a test mode; disabling, by using an external power received from an external device, at least a part of components of a reference generating circuit that is configured to generate a plurality of operating voltages, an internal clock signal, and an internal power; receiving an external clock signal from the external device; receiving an operation command from the external device; and performing a plurality of logic sequences based on the external clock signal and the internal power, based on the operation command, wherein a frequency of the external clock signal is lower than or equal to a frequency of the internal clock signal.

According to yet another aspect of one or more embodiments, an operation method of a test device configured to test a memory device, the operation method may include transmitting, to the memory device, a test command for entering a test mode; transmitting an operation command to the memory device; transmitting an external power and an external clock signal to the memory device; measuring an external current of the external power while the memory device performs a plurality of logic sequences corresponding to the operation command; detecting a leakage current of the memory device based on the external current; and when the leakage current is detected, screening the memory device, wherein a frequency of the external clock signal is lower than or equal to a frequency of an internal clock signal used in the memory device.

BRIEF DESCRIPTION OF THE FIGURES

The above and other aspects will become apparent by describing in detail embodiments thereof with reference to the accompanying drawings.

DETAILED DESCRIPTION

Below, various embodiments will be described in detail and clearly to such an extent that an ordinary one in the art easily carries out the various embodiments. As used in this specification, the phrase "at least one A, B, and C" includes within its scope "only A", "only B", "only C", "both A and B", both A and C", "both B and C", and "all of A, B, and C".

Figure 1:
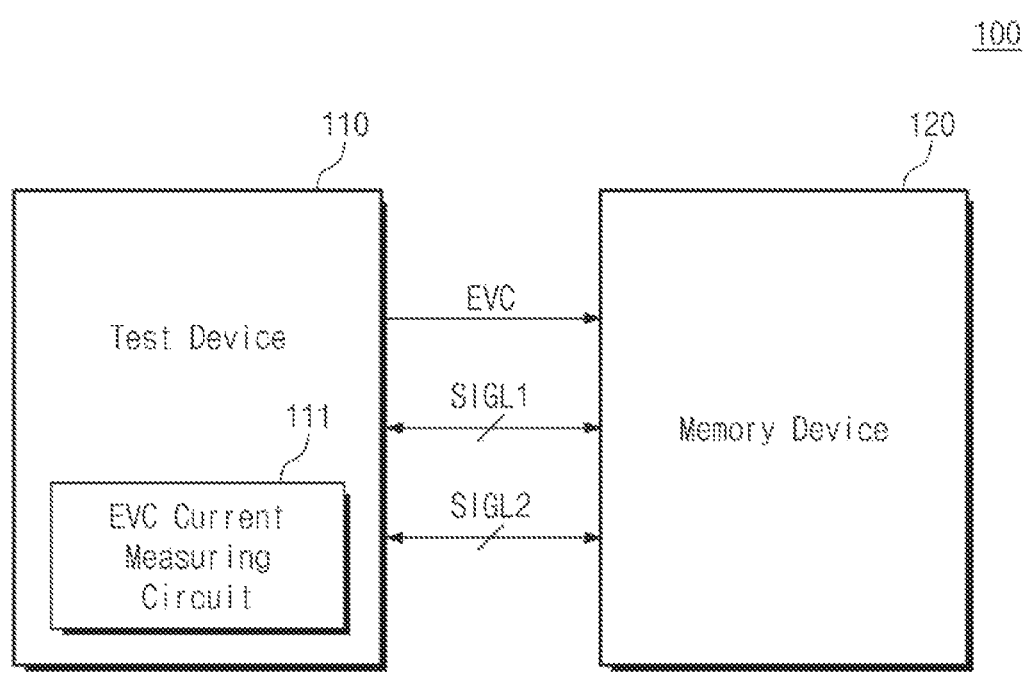
FIG. 1 is a block diagram illustrating a memory system according to some embodiments.

FIG. 1 is a block diagram illustrating a memory system according to some embodiments. Referring to FIG. 1, a memory system 100 may include a test device 110 and a memory device 120. In an embodiment, the memory system 100 may be a system for performing a test operation on the memory device 120 in the process of manufacturing the memory device 120.

The test device 110 may perform the test operation on the memory device 120 to determine whether the memory device 120 is defective (or faulty). For example, the test device 110 may perform an electrical die sorting (EDS) process on the memory device 120 to determine whether the memory device 120 is defective. In detail, the test device 110 may provide an external power EVC to the memory device 120. The test device 110 may determine whether the memory device 120 operates normally, by controlling the memory device 120 through first signal lines SIGL1 and second signal lines SIGL2.

In an embodiment, the first signal lines SIGL1 may include data signal lines (e.g., DQ lines) and a data strobe signal line (e.g., a DQS line). The data signal lines (e.g., DQ lines) may be for transmitting/receiving a command, an address, or data. The second signal lines SIGL2 may include various control signals (e.g., CLE, ALE, nRE, and nWE) for identifying signals transmitted/received through the first signal lines SIGL1 (e.g., determining whether the signals correspond to a command, an address, or data) or various control signals (e.g., nCE and nR/B) used for controlling the memory device 120.

The memory device 120 may operate under control of the test device 110. For example, the memory device 120 may perform various operations (e.g., a program operation and a read operation) based on the signals received from the test device 110 through the first signal lines SIGL1 and the second signal lines SIGL2. In an embodiment, the memory device 120 may enter a test mode under control of the test device 110. In the test mode, under control of the test device 110, the memory device 120 may be configured to perform a normal operation or to perform an operation specialized for the test operation.

In an embodiment, the memory device 120 may be a flash memory device. However the present disclosure is not limited thereto. For example, the memory device 120 may include at least one of various memory devices such as an SRAM, a DRAM, a PRAM, an MRAM, and an FRAM.

In an embodiment, the memory device 120 may include various components. A defect occurring in some of the various components may cause a leakage current. The test device 110 may determine whether the memory device 120 is defective (or faulty), by detecting the leakage current. For example, the test device 110 may include an external power (EVC) current measuring circuit 111. The external power (EVC) current measuring circuit 111 may measure a current (hereinafter referred to as an "external current") of the external power EVC during the test operation associated with the memory device 120. Whether the memory device 120 is defective may be determined based on the measured external current.

In an embodiment, in the process of driving or testing the memory device 120, an external current may be consumed in the memory device 120 in units of several mA, and a leakage current caused by the defect of a specific component is consumed in units of several or tens of uA. That is, even though the leakage current is caused by the defect of the specific component, because the external current is relatively great, the leakage current may not be detected normally.

According to some embodiments, the memory device 120 may disable components, which use a relatively large amount of external current, during the test operation. In this case, the external current that is measured by the test device 110 may be relatively small. Accordingly, the leakage current whose magnitude is relatively small may be easily detected. A configuration and an operation according to some embodiments will be described in detail with reference to the following drawings.

Figure 2:
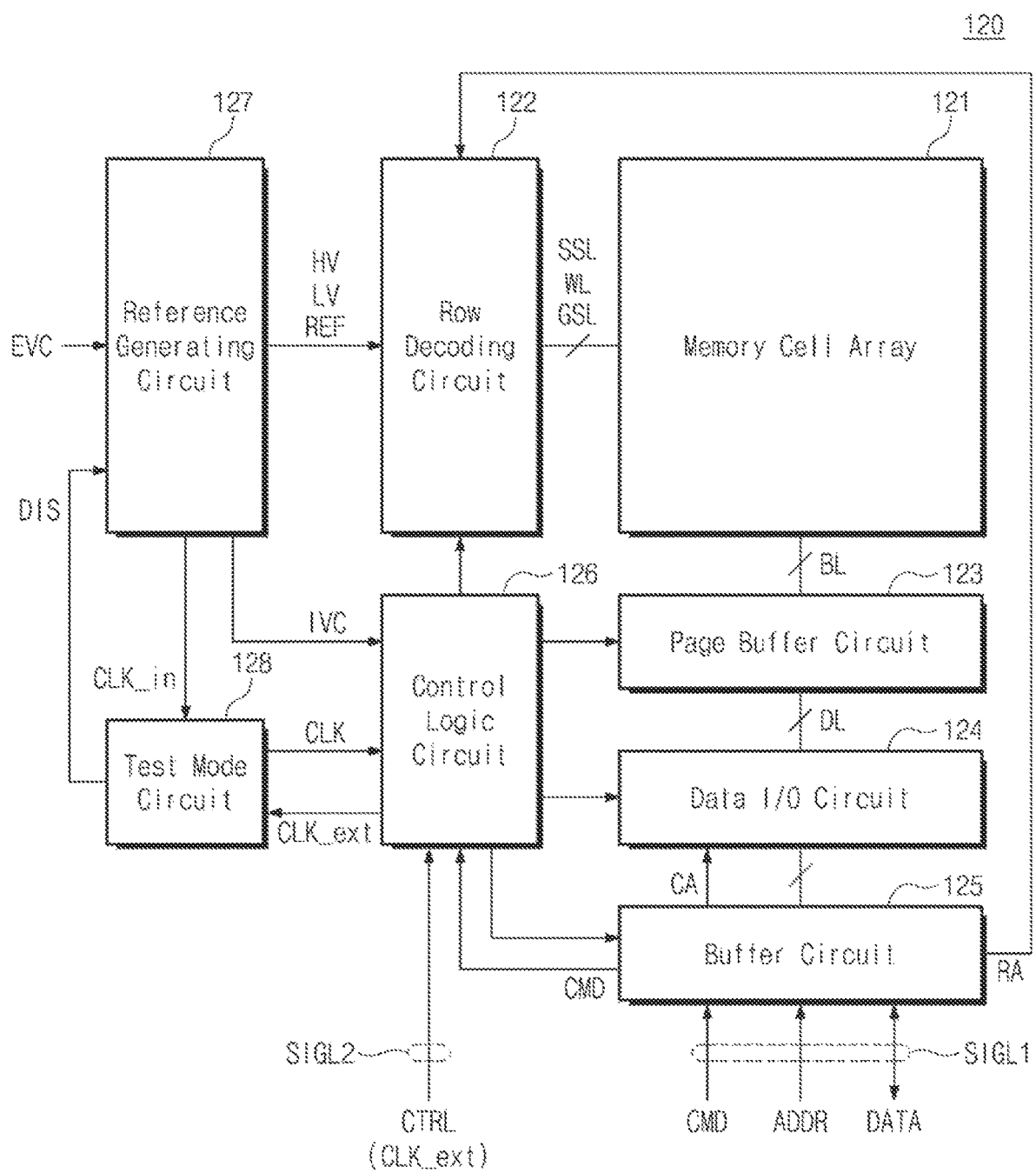
FIG. 2 is a block diagram illustrating a memory device of FIG. 1, according to some embodiments.

FIG. 2 is a block diagram illustrating a memory device of FIG. 1, according to some embodiments. Referring to FIG. 1, the memory device 120 may include a memory cell array 121, a row decoding circuit 122, a page buffer circuit 123, a data input/output circuit 124, a buffer circuit 125, a control logic circuit 126, a reference generating circuit 127, and a test mode circuit 128.

The memory cell array 121 may include a plurality of memory blocks. Each of the plurality of memory blocks may include a plurality of memory cells. Each of the plurality of the memory blocks may be connected to at least one ground selection line GSL, a plurality of word lines WL, and at least one string selection lines SSL. The plurality of memory blocks may be connected in common to a plurality of bit lines BL. In an embodiment, each of the plurality of memory blocks may have a three-dimensional structure in which the plurality of memory blocks are stacked in a direction perpendicular to a substrate (not illustrated).

The row decoding circuit 122 may be connected to the memory cell array 121 through the ground selection lines GSL, the word lines WL, and the string selection lines SSL. The row decoding circuit 122 may operate under control of the control logic circuit 126. For example, the row decoding circuit 122 may receive a row address RA from the buffer circuit 125 and may decode the received row address RA. The row decoding circuit 122 may control the ground selection lines GSL, the word lines WL, and the string selection lines SSL based on the decoding result. As an example, the row decoding circuit 122 may apply a high voltage HV, a low voltage LV, a reference voltage REF, or various other operating voltages, which are received from the reference generating circuit 127, to the ground selection lines GSL, the word lines WL, and the string selection lines SSL.

The page buffer circuit 123 may be connected to the memory cell array 121 through the plurality of bit lines BL. The page buffer circuit 123 may be connected to the data input/output circuit 124 through a plurality of data lines DL. The page buffer circuit 123 may operate under control of the control logic circuit 126. For example, in the program operation of the memory device 120, the page buffer circuit 123 may store data to be written in the memory cell array 121. The page buffer circuit 123 may control voltages of the plurality of bit lines BL based on the stored data. In the read operation of the memory device 120, the page buffer circuit 123 may sense voltage changes of the plurality of bit lines BL and may store data based on the sensed voltage changes.

The data input/output circuit 124 may be connected to the page buffer circuit 123 through the plurality of data lines DL. The data input/output circuit 124 may receive a column address CA from the buffer circuit 125. The data input/output circuit 124 may transfer data from the page buffer circuit 123 to the buffer circuit 125 based on the received column address CA. Alternatively, the data input/output circuit 124 may transfer data from the buffer circuit 125 to the page buffer circuit 123 based on the received column address CA.

The buffer circuit 125 may receive a command CMD and an address ADDR from an external device (e.g., the test device 110 or a memory controller). The buffer circuit 125 may exchange data "DATA" with the external device (e.g., the test device 110 or a memory controller). For example, through the first signal lines SIGL1, the buffer circuit 125 may receive the command CMD and the address ADDR and may transmit/receive the data "DATA". The buffer circuit 125 may transfer the received command CMD to the control logic circuit 126. The buffer circuit 125 may transfer the row address RA of the received address ADDR to the row decoding circuit 122 and may transfer the column address CA of the received address ADDR to the data input/output circuit 124.

The control logic circuit 126 may receive control signals CTRL from the external device (e.g., the test device 110 or a memory controller). For example, the control logic block 126 may receive the control signals CTRL through the second signal lines SIGL2. In an embodiment, the control signals CTRL may include various signals (e.g., nCE, CLE, ALE, nRE, nWE, and nR/B). The control logic circuit 126 may control the buffer circuit 125 in response to the control signals CTRL such that the buffer circuit 125 identifies (or distinguishes) the command CMD, the address ADDR, and the data "DATA". The control logic circuit 126 may receive the command CMD from the buffer circuit 125 and may decode the received command CMD. The control logic circuit 126 may control various operations of the memory device 120 based on the decoding result.

The reference generating circuit 127 may generate various voltages used for the memory device 120. For example, the reference generating circuit 127 may receive the external power EVC from the external device (e.g., the test device 110 or a memory controller). The reference generating circuit 127 may generate the following by using the external power EVC: the high voltage HV, the low voltage LV, the reference voltage REF, an internal clock signal CLK_in, or an internal power IVC. In an embodiment, various voltages such as the high voltage HV, the low voltage LV, and the reference voltage REF may include various operating voltages (e.g., program voltages, pass voltages, verify voltages, read voltages, and erase voltages) used in the memory device 120. The internal clock signal CLK_in and the internal power IVC may be used in various components of the memory device 120 while the memory device 120 operates.

The test mode circuit 128 may be configured to disable some of components of the reference generating circuit 127 in the test mode of the memory device 120. For example, the memory device 120 may enter the test mode under control of the test device 110 (refer to FIG. 1). When the memory device 120 enters the test mode, the test mode circuit 128 may provide a disable signal DIS to the reference generating circuit 127. The reference generating circuit 127 may disable some components based on the disable signal DIS. For example, in some embodiments, the reference generating circuit 127 may disable the components in response to the disable signal DIS. In detail, the reference generating circuit 127 may disable remaining components other than one or more components necessary for generating the internal power IVC. In this case, the reference generating circuit 127 may generate only the internal power IVC, and the remaining voltages or signals (e.g., HV, LV, REF, and CLK_in) may not be generated.

The test mode circuit 128 may be configured to select a clock signal CLK in the test mode of the memory device 120. For example, when the memory device 120 is not in the test mode (i.e., when the memory device 120 is in a normal mode), the test mode circuit 128 may select the internal clock signal CLK_in generated from the reference generating circuit 127 as the clock signal CLK. Alternatively, when the memory device 120 is in the test mode, the test mode circuit 128 may select an external clock signal CLK_ext as the clock signal CLK. The clock signal CLK thus selected may be provided to the control logic circuit 126. The control logic circuit 126 may operate by using the clock signal CLK. In other words, in the test mode, the control logic circuit 126 may operate by using the external clock signal CLK_ext, and in the normal mode, the control logic circuit 126 may operate using the internal clock signal CLK_in. In an embodiment, the frequency of the external clock signal CLK_ext may be identical to the frequency of the internal clock signal CLK_in generated within the memory device 120. Alternatively, the frequency of the external clock signal CLK_ext may be different from the frequency of the internal clock signal CLK_in generated within the memory device 120. In an embodiment, the frequency of the external clock signal CLK_ext may be lower than or equal to the frequency of the internal clock signal CLK_in generated within the memory device 120.

In an embodiment, the external clock signal CLK_ext may be provided from the test device 110 through the second signal lines SIGL2. As an example, in some embodiments, the external clock signal CLK_ext may be provided through a read enable signal nRE. In some embodiments, the external clock signal CLK_ext may be provided through at least one of various control signals such as a data signal DQ, a data strobe signal DQS, a write enable signal nWE, and a write protect signal WPx.

As described above, when the memory device 120 operates in the test mode, the reference generating circuit 127 may generate only the internal power IVC and may not generate the remaining voltages or signals (e.g., HV, LV, REF, and CLK_in). In this case, the amount of current that is consumed in the reference generating circuit 127 may decrease. Because the clock signal CLK used for the control logic circuit 126 to operate is provided as the external clock signal CLK_ext from the external device (e.g., the test device 110), the control logic circuit 126 may normally operate in the test mode of the memory device 120. In this case, during the test mode of the memory device 120, only the operation of the control logic circuit 126 may be tested. Since the amount of current consumed in the reference generating circuit 127 decreases, a leakage current due to various defects present in the control logic circuit 126 may be easily detected.

In an embodiment, the memory device 120 may enter the test mode based on signals (e.g., the command CMD, the address ADDR, or the data "DATA") received through the first signal lines SIGL1. For example, in some embodiments, the memory device 120 may enter the test mode in response to one or more of the signals received through the first signal lines SIGL1. For example, the test device 110 may transmit the command CMD indicating the test mode to the memory device 120 through the first signal lines SIGL1. The memory device 120 may enter the test mode in response to the received command CMD. In this case, as described above, the test mode circuit 128 may disable some of the components of the reference generating circuit 127 and may provide the external clock signal CLK_ext to the control logic circuit 126 as the clock signal CLK. Afterwards, the test device 110 may transmit various commands CMD (e.g., a program command, a read command, and an erase command) for the test operation to the memory device 120. The memory device 120 may perform a relevant operation in response to the received command CMD. In this case, as described above, because some of the components of the reference generating circuit 127 are disabled, some (e.g., the row decoding circuit 122, the page buffer circuit 123, and the data input/output circuit 124) of the components may not operate normally. However, during the test mode of the memory device 120, because the internal power IVC and the clock signal CLK are normally provided, the control logic circuit 126 may normally perform logic sequences determined in advance or logic sequences corresponding to a command. Accordingly, it may be easy to determine whether the control logic circuit 126 operates normally or to detect a leakage current due to various defects (e.g., a defect between a gate, an active, and a metal line of a transistor) of the control logic circuit 126. In other words, it may be easier to detect a leakage current in the control logic circuit 126.

Figure 3:
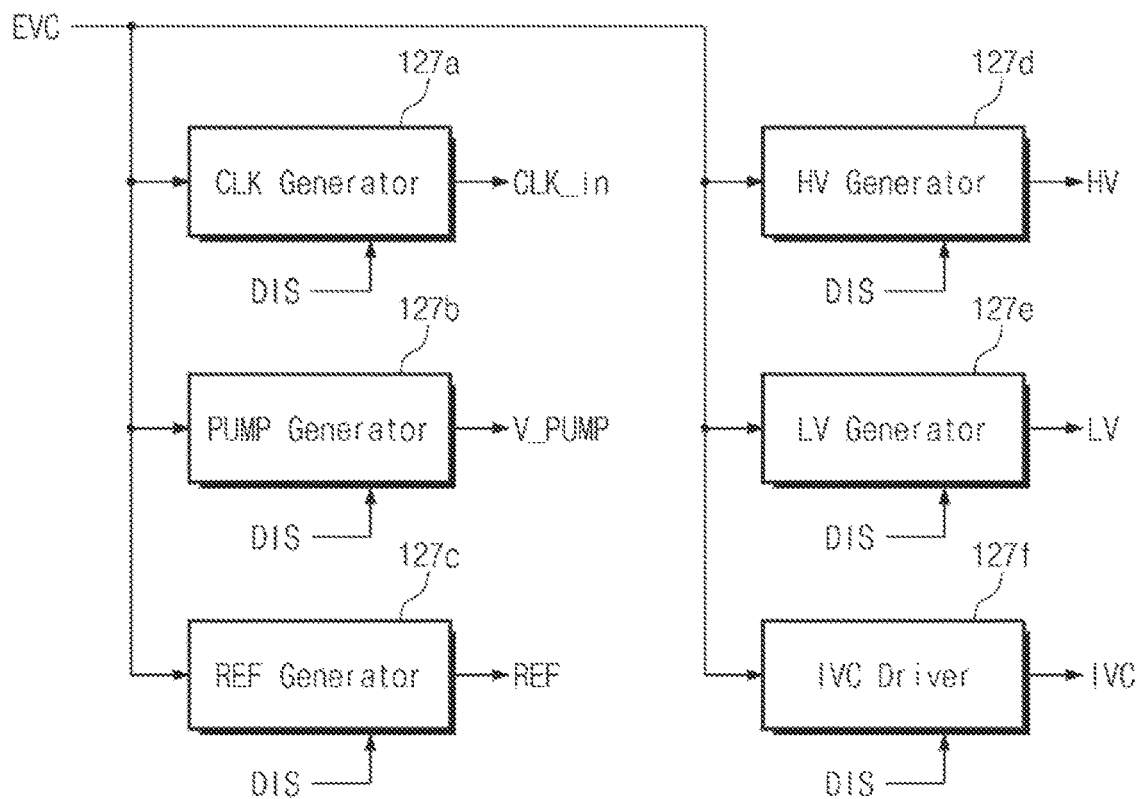
FIG. 3 is a block diagram illustrating a reference generating circuit of FIG. 2, according to some embodiments.

FIG. 3 is a block diagram illustrating a reference generating circuit of FIG. 2, according to some embodiments. Referring to FIGS. 2 and 3, the reference generating circuit 127 may include a clock (CLK) generator 127a, a pump voltage (PUMP) generator 127b, a reference voltage (REF) generator 127c, a high voltage (HV) generator 127d, a low voltage (LV) generator 127e, and an internal power (IVC) driver 127f.

The clock (CLK) generator 127a may generate the internal clock signal CLK_in by using the external power EVC. In an embodiment, the clock generator 127a may be an oscillator configured to generate the internal clock signal CLK_in.

The pump voltage (PUMP) generator 127b may generate a pump voltage V_PUMP by using the external power EVC. In an embodiment, the pump voltage V_PUMP may be used in any other components of the reference generating circuit 127 for the purpose of generating various voltages.

The reference voltage (REF) generator 127c may generate the reference voltage REF by using the external power EVC. In an embodiment, the reference voltage generator 127c may be a band gap reference (BGR) circuit configured to generate the reference voltage REF.

The high voltage (HV) generator 127d may generate the high voltage HV by using the external power EVC. In an embodiment, the high voltage HV may include relatively high voltages, which are used in the memory device 120, such as a program voltage and an erase voltage. The low voltage (LV) generator 127e may generate the low voltage LV by using the external power EVC. In an embodiment, the low voltage LV may include relatively low voltages, which are used in the memory device 120, such as a read voltage and a verify voltage. The levels of the high voltage HV and the low voltage LV may be relative, and the present disclosure is not limited thereto.

The internal power (IVC) driver 127f may generate the internal power IVC by using the external power EVC. In an embodiment, the internal power driver 127f may be a voltage regulator configured to uniformly maintain the voltage level of the internal power IVC. In an embodiment, the internal power driver 127f may include a plurality of sub-drivers. The plurality of sub-drivers may be selectively enabled or disabled depending on the operation of the memory device 120. For example, when the memory device 120 performs an operation that consumes a relatively large power (e.g., a data input/output operation), "n" sub-drivers among the plurality of sub-drivers may be enabled; when the memory device 120 performs an operation that consumes a relatively small power (e.g., an operation of receiving a command), "k" sub-drivers among the plurality of sub-drivers (k being a natural number smaller than n) may be enabled. In an embodiment, when the memory device 120 does not perform a separate operation (i.e., when the memory device 120 is in an idle state or a standby state), only a sub-driver corresponding to the standby state from among the plurality of sub-drivers may be enabled.

In an embodiment, the description is given with reference to FIG. 3 in which the reference generating circuit 127 includes the pump voltage generator 127b, the reference voltage generator 127c, the high voltage generator 127d, and the low voltage generator 127e, but the present disclosure is not limited thereto. For example, the pump voltage generator 127b, the reference voltage generator 127c, the high voltage generator 127d, and the low voltage generator 127e may be collectively referred to as a "voltage generator" configured to generate a plurality of operating voltages necessary for the memory device 120 to operate.

The configuration of the reference generating circuit 127 described with reference to FIG. 3 is provided as an example, and the present disclosure is not limited thereto. The reference generating circuit 127 may further include any other components in addition to the components illustrated in FIG. 3, for example, components configured to generate various operating voltages used for the memory device 120 to operate.

In an embodiment, some of the components of the reference generating circuit 127 may be disabled based on the disable signal DIS from the test mode circuit 128. The clock generator 127a, the pump voltage generator 127b, the reference voltage generator 127c, the high voltage generator 127d, and the low voltage generator 127e may be disabled based on the disable signal DIS from the test mode circuit 128. For example, in some embodiments, the clock generator 127a, the pump voltage generator 127b, the reference voltage generator 127c, the high voltage generator 127d, and the low voltage generator 127e may be disabled in response to the disable signal DIS from the test mode circuit 128. When the clock generator 127a, the pump voltage generator 127b, the reference voltage generator 127c, the high voltage generator 127d, and the low voltage generator 127e are disabled, the internal clock signal CLK_in, the pump voltage V_PUMP, the reference voltage REF, the high voltage HV, and the low voltage LV may not be generated. In this case, because only the internal power driver 127f is enabled or operates, the entire current consumption may be reduced.

In an embodiment, during the test mode of the memory device 120 (or while the disable signal DIS is output), only a sub-driver (e.g., a standby-mode sub-driver) corresponding to the standby state from among the plurality of sub-drivers of the internal power driver 127f may operate, and the remaining sub-drivers may be disabled.

Figure 4:
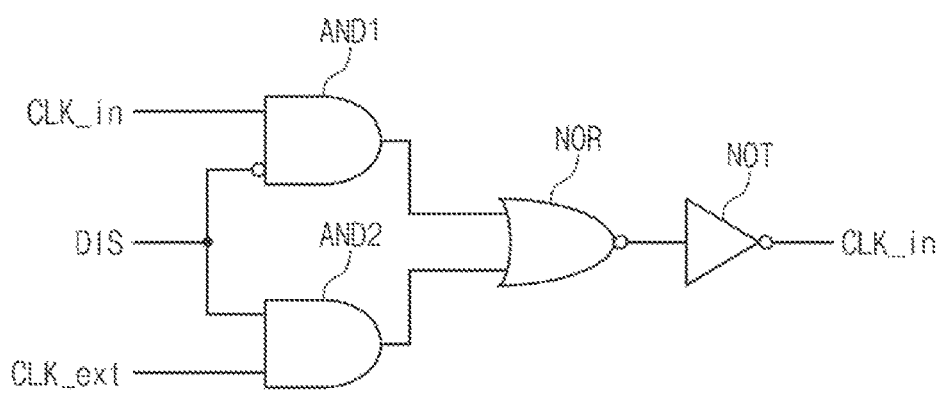
FIG. 4 is a diagram illustrating a test mode circuit of FIG. 2, according to some embodiments.

FIG. 4 is a diagram illustrating a test mode circuit of FIG. 2. An operation in which the test mode circuit 128 selects the clock signal CLK will be described with reference to FIG. 4. However, the present disclosure is not limited thereto.

Referring to FIGS. 2 and 4, the test mode circuit 128 may include a first AND gate AND1 and a second AND gate AND2, a NOR gate NOR, and an inverter NOT. The first AND gate AND1 may perform an AND operation on the internal clock signal CLK_in and an inverted version of the disable signal DIS. The second AND gate AND2 may perform an AND operation on the external clock signal CLK_in and the disable signal DIS. The NOR gate NOR may perform a NOR operation on an output of the first AND gate AND1 and an output of the second AND gate AND2. The inverter NOT may perform a NOT operation on an output of the NOR gate. An output of the inverter NOT may be output as the clock signal CLK.

According to the structure of the test mode circuit 128 of FIG. 4, when the disable signal DIS is at a logic high level (i.e., when the memory device 120 is in the test mode), the clock signal CLK may be output in synchronization with the external clock signal CLK_ext. That is, the external clock signal CLK_ext may be selected as the clock signal CLK. When the disable signal DIS is at a logic low level (i.e., when the memory device 120 is in the normal mode), the clock signal CLK may be output in synchronization with the internal clock signal CLK_in. That is, the internal clock signal CLK_in may be selected as the clock signal CLK.

The structure of the test mode circuit 128 of FIG. 4 is provided as an example, and the present disclosure is not limited thereto. For example, the test mode circuit 128 may be implemented such that one of the internal clock signal CLK_in and the external clock signal CLK_ext is selected as the clock signal CLK depending on whether the memory device 120 operates in the test mode.

Figure 5:
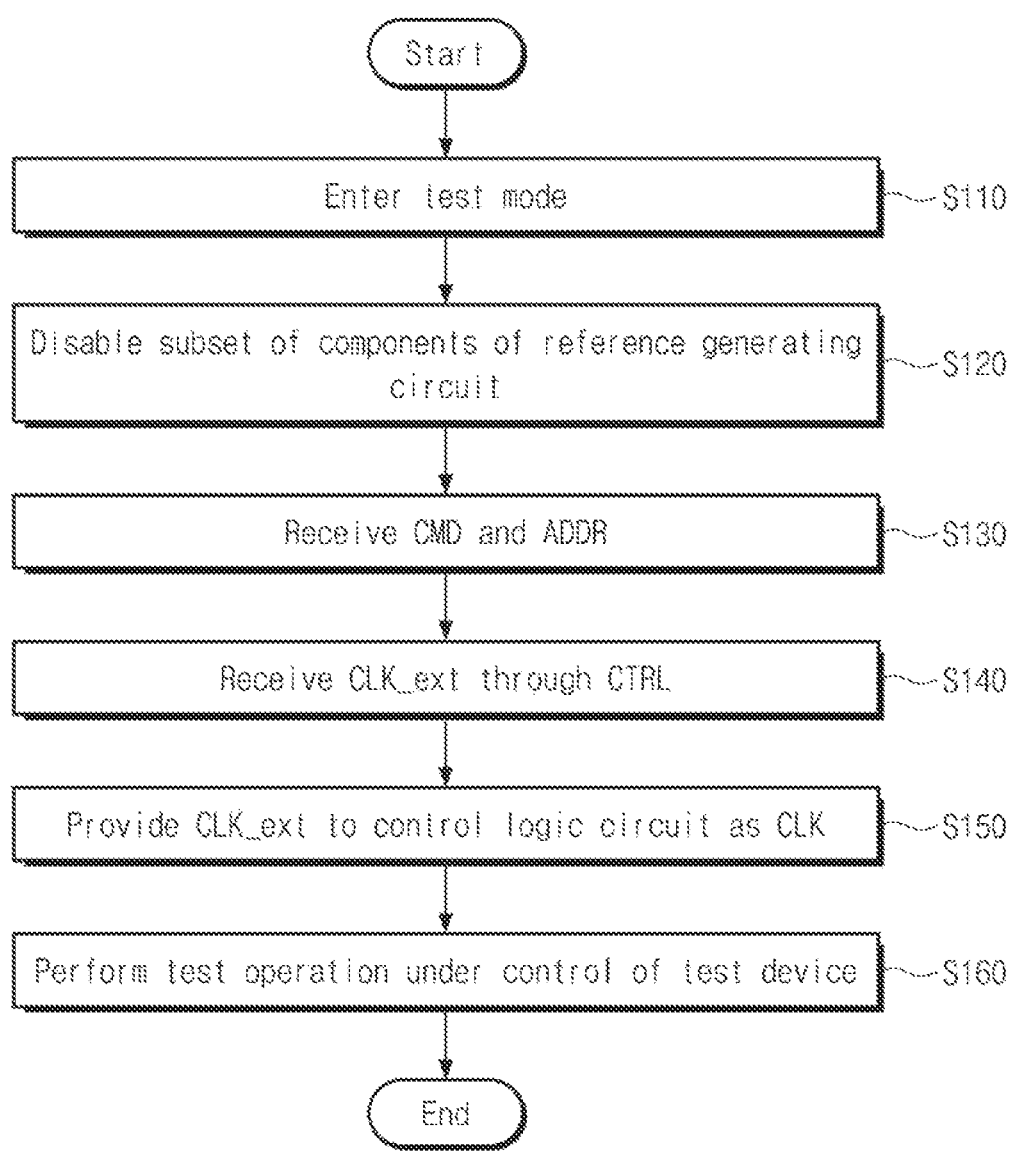
FIG. 5 is a flowchart illustrating an operation of a memory device of FIG. 2, according to some embodiments.

FIG. 5 is a flowchart illustrating an operation of a memory device of FIG. 2 according to some embodiments. Referring to FIGS. 2 and 5, in operation S110, the memory device 120 may enter the test mode. For example, the memory device 120 may enter the test mode under control of the test device 110. For example, the memory device 120 may receive a command indicating to enter the test mode from the test device 110. The memory device 120 may enter the test mode based on the received command. For example, in some embodiments, the memory device 120 may enter the test mode in response to the received command. In an embodiment, the command indicating to enter the test mode may be a command defined by a combination of specific commands or a vendor-specific command.

In operation S120, the memory device 120 may disable a subset of components of the reference generating circuit 127. For example, as described with reference to FIGS. 2 and 3, the memory device 120 may disable the subset of the reference generating circuit 127. In an embodiment, the subset of the reference generating circuit 127 may include remaining components other than the internal power driver 127f configured to generate the internal power IVC. That is, in some embodiments, in the test mode, the reference generating circuit 127 may generate only the internal power IVC that is used in the control logic circuit 126.

In operation S130, the memory device 120 may receive the command CMD and the address ADDR. For example, the memory device 120 may receive the command CMD and the address ADDR from the test device 110. In an embodiment, the command CMD and the address ADDR may correspond to information about various test operations of the memory device 120. The test operation may include various operations of the memory device 120, such as a program operation, a read operation, or an erase operation.

In operation S140, the memory device 120 may receive the external clock signal CLK_ext through the control signals CTRL. For example, the memory device 120 may receive the external clock signal CLK_ext from the test device 110 through the control signals CTRL. For example, the memory device 120 may receive the external clock signal CLK_ext from the test device 110 through a signal line through which the read enable signal nRE is received. However, the present disclosure is not limited thereto. For example, the memory device 120 may receive the external clock signal CLK_ext from the test device 110 by using one of the control signals CTRL received through the second signal lines SIGL2. In an embodiment, the external clock signal CLK_ext may be received from the test device 110 through a test dedicated line for the test operation.

In operation S150, the memory device 120 may provide the control logic circuit 126 with the external clock signal CLK_ext as the clock signal CLK. In an embodiment, the control logic circuit 126 may perform various logic sequences by using the clock signal CLK (i.e., the external clock signal CLK_ext). In an embodiment, the logic sequences may indicate operations of respectively controlling various components of the memory device 120 for the purpose of performing the operation of the memory device 120.

In operation S160, the memory device 120 may perform the test operation under control of the test device 110. For example, the memory device 120 may perform the test operation based on the command CMD and the address ADDR thus received. For example, in some embodiments, the memory device 120 may perform the test operation in response to the command CMD and the address ADDR thus received. In an embodiment, the test operation may include various operations of the memory device 120, such as a program operation, a read operation, or an erase operation.

In an embodiment, while the above test operation is performed, the remaining components (e.g., the row decoding circuit 122, the page buffer circuit 123, and the data input/output circuit 124) of the memory device 120 may not operate normally, but the control logic circuit 126 may operate normally. That is, the remaining components of the memory device 120 except for the control logic circuit 126 may be disabled so as not to consume current. In the case where a defect is present in the control logic circuit 126, a leakage current may be caused. In this case, because there is no current consumption by the remaining components, during the test mode, the magnitude of the external current may be relatively small, and thus, the leakage current may be detected normally.

Figure 6:
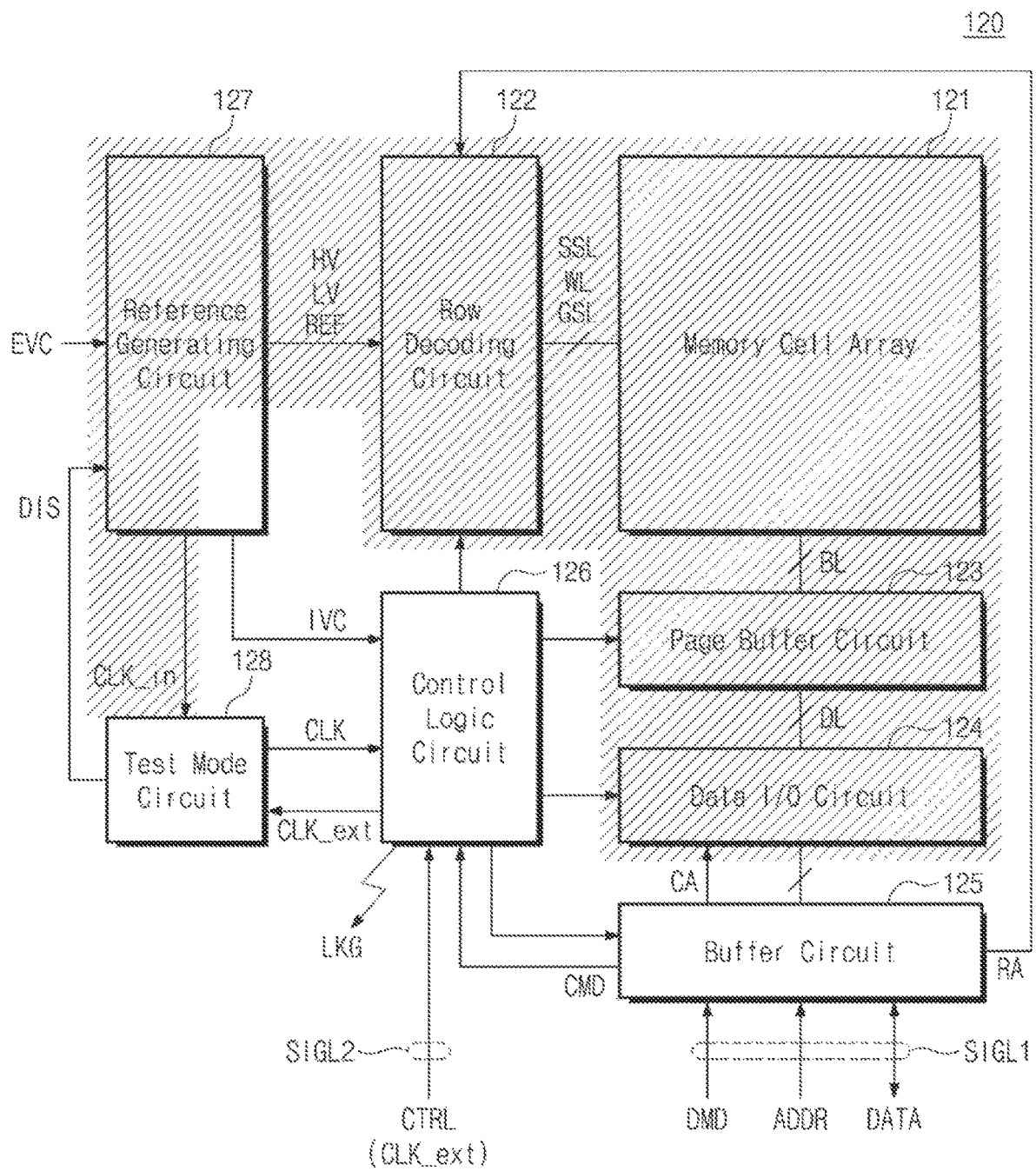
FIG. 6 is a block diagram for describing a test mode of a memory device according to the flowchart of FIG. 5, according to some embodiments.

FIG. 6 is a block diagram for describing a test mode of a memory device according to the flowchart of FIG. 5, according to some embodiments. Referring to FIGS. 5 and 6, the memory device 120 may include the memory cell array 121, the row decoding circuit 122, the page buffer circuit 123, the data input/output circuit 124, the buffer circuit 125, the control logic circuit 126, the reference generating circuit 127, and the test mode circuit 128. The operations of the memory cell array 121, the row decoding circuit 122, the page buffer circuit 123, the data input/output circuit 124, the buffer circuit 125, the control logic circuit 126, the reference generating circuit 127, and the test mode circuit 128 are described with reference to FIG. 2, and thus, additional repeated description will be omitted to avoid redundancy and for conciseness.

When the memory device 120 enters the test mode, as illustrated in FIG. 6, some components may be disabled. For example, when the memory device 120 enters the test mode, a subset of the components of the reference generating circuit 127 may be disabled based on the disable signal DIS from the test mode circuit 128. For example, in some embodiments, the subset of components may be disabled in response to the disable signal DIS from the test mode circuit 128. In this case, the remaining voltages or signals (e.g., HV, LV, REF, and CLK_in) other than the internal power IVC may not be generated. According to the above description, components (e.g., the row decoding circuit 122, the page buffer circuit 123, and the data input/output circuit 124) that use the remaining voltages or signals (e.g., HV, LV, REF, and CLK_in) other than the internal power IVC may not operate normally. That is, the row decoding circuit 122, the page buffer circuit 123, and the data input/output circuit 124 that use the HV, LV, REF, and CLK_in other than the internal power IVC may be disabled so as not to consume current.

In other words, when the memory device 120 enters the test mode, only the buffer circuit 125 that receives the command CMD and the address ADDR from the test device 110 and the control logic circuit 126 that performs an operation (or a logic sequence) under control of the test device 110 may operate normally. The remaining components other than the buffer circuit 125 for receiving the command CMD and the address ADDR from the test device 110 and the control logic circuit 126 performing an operation (or a logic sequence) under control of the test device 110 may be included in a disable domain.

In this case, because the external current of the external power EVC is relatively small in magnitude, a relatively small leakage current LKG that is caused in the control logic circuit 126 may be detected normally.

Figure 7:
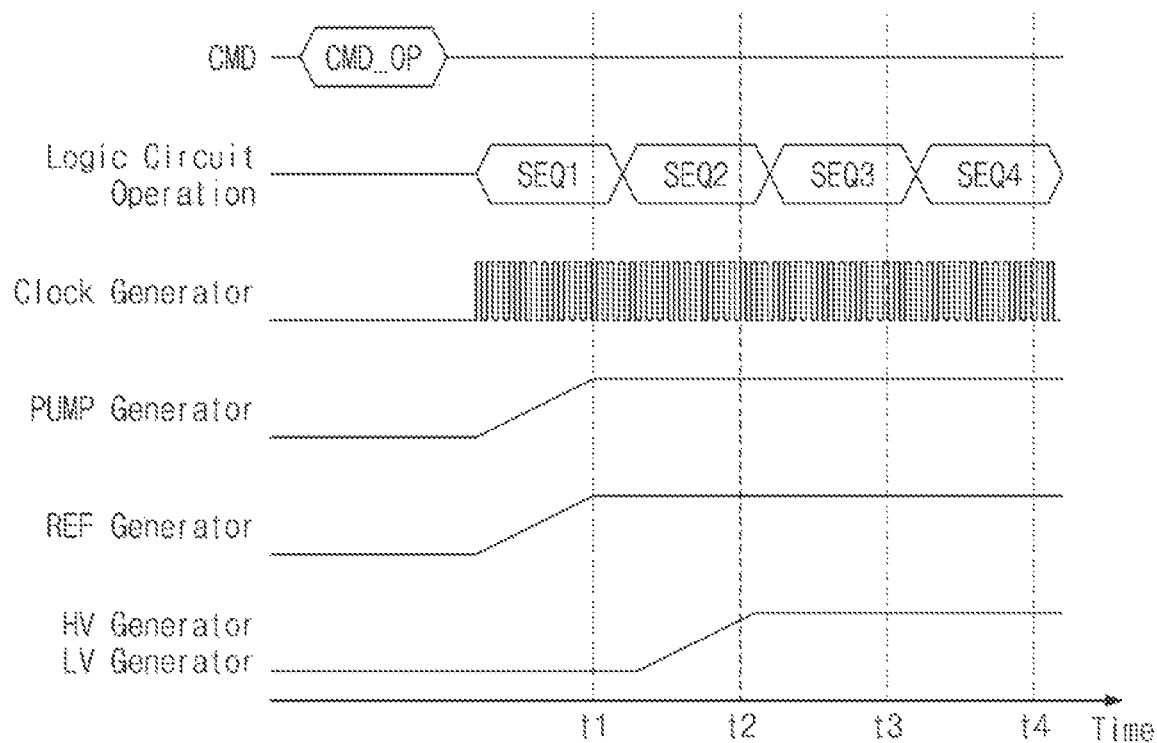
FIGS. 7 and 8 are timing diagrams for describing a test operation of a memory device of FIG. 1, according to some embodiments.
Figure 8:
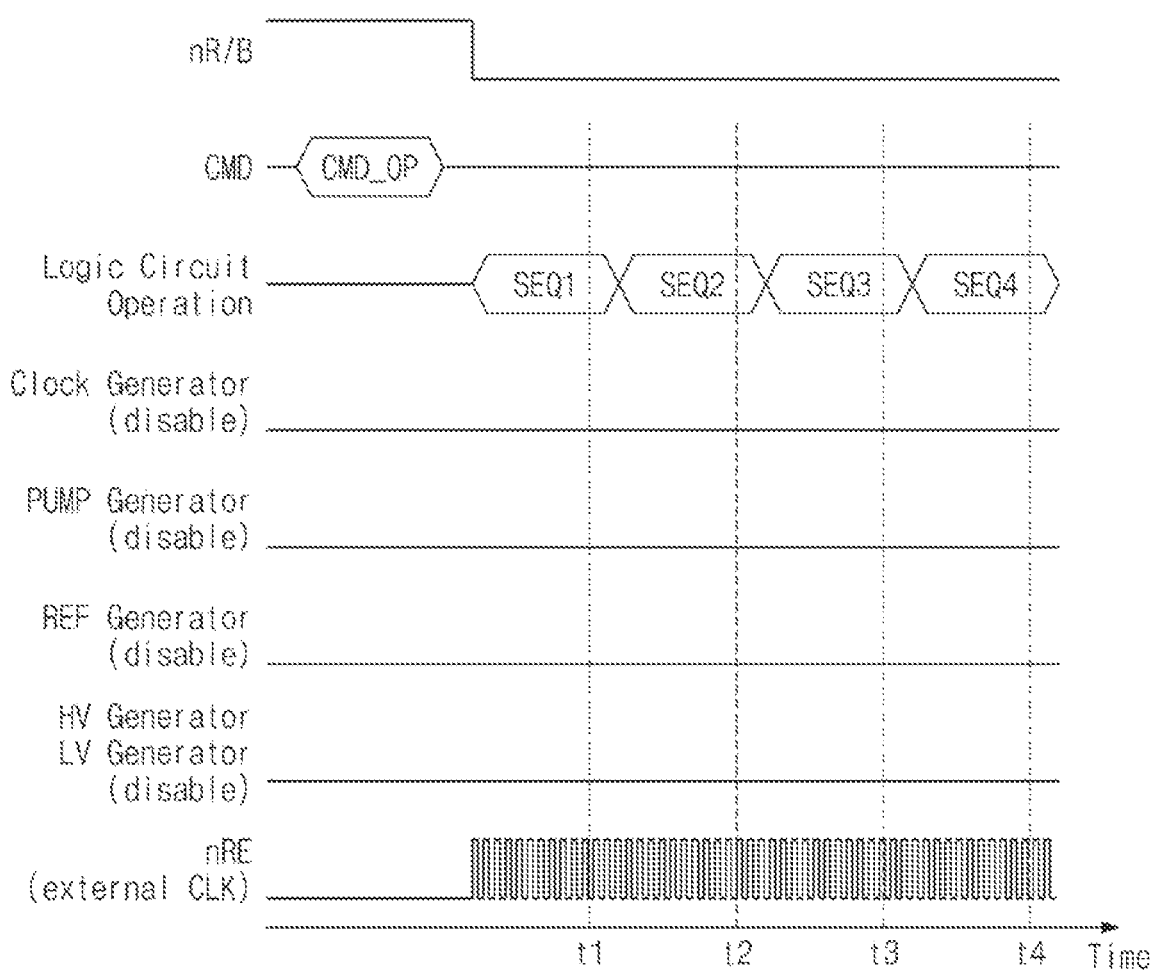

FIGS. 7 and 8 are timing diagrams for describing a test operation of a memory device of FIG. 1, according to some embodiments. A related art test operation will be described with reference to FIG. 7, and a test operation of the memory device 120 according to some embodiments will be described with reference to FIG. 8.

Referring to FIG. 7, a memory device may perform the test operation under control of a test device. For example, after entering the test mode under control of the test device, the memory device may receive an operation command CMD_OP from the test device. The operation command CMD_OP may be a command for the test operation of the memory device. The operation command CMD_OP may be a command corresponding to a normal operation (e.g., a program operation, a read operation, or an erase operation) of the memory device.

When the operation command CMD_OP is received, the memory device may perform an operation corresponding to the operation command CMD_OP. For example, in response to the operation command CMD_OP, a clock generator of a reference generating circuit may generate the internal clock signal CLK_in. A control logic circuit may sequentially perform a plurality of logic sequences SEQ1 to SEQ4 based on the internal clock signal CLK_in. According to the first logic sequence SEQ1 of the control logic circuit, a pump voltage generator and a reference voltage generator may operate. According to the second logic sequence SEQ2 of the control logic circuit, a high voltage generator and a low voltage generator may operate. According to the third and fourth logic sequences SEQ3 and SEQ4 of the control logic circuit, all the components of the reference generating circuit may operate.

By contrast, referring to FIGS. 1 and 8, the memory device 120 may perform the test operation under control of the test device 110. For example, after entering the test mode under control of the test device 110, the memory device 120 may receive the operation command CMD_OP from the test device 110. The operation command CMD_OP may be a command for the test operation of the memory device 120. In an embodiment, the operation command CMD_OP may be a command corresponding to a normal operation (e.g., a program operation, a read operation, or an erase operation) of the memory device 120.

When the operation command CMD_OP is received, the memory device 120 may perform an operation corresponding to the operation command CMD_OP. Unlike the description given with reference to FIG. 7, in FIG. 8, the memory device 120 according to some embodiments may disable some of the components of the reference generating circuit 127. For example, when the control logic circuit 126 sequentially performs the plurality of logic sequences SEQ1 to SEQ4, some of the components of the reference generating circuit 127 (e.g., the remaining generators other than the internal power driver 127f) may be disabled. In this case, for the normal operation of the control logic circuit 126, the external clock signal CLK_ext may be received from the test device 110. The control logic circuit 126 may normally operate by using the external clock signal CLK_ext.

In an embodiment, when the ready/busy signal nR/B output from the memory device 120 indicates a busy state (e.g., has a logic low level), the test device 110 may measure the external current of the external power EVC. For example, while the control logic circuit 126 performs the plurality of logic sequences SEQ1, SEQ2, SEQ3, and SEQ4, the ready/busy signal nR/B may indicate a busy state (e.g., may have a logic low level). In this case, the test device 110 may measure the external current. In detail, at each of first to fourth point in times t1, t2, t3, and t4, the test device 110 may measure the external current.

In this case, in FIG. 7, because all the components of the reference generating circuit 127 operate, the measured magnitude of the external current may be relatively great. In contrast, in FIG. 8, according to some embodiments, because some of the components of the reference generating circuit 127 are disabled, the measured magnitude of the external current may be relatively small. When the magnitude of the external current measured by the test device 110 is relatively small, the leakage current of the control logic circuit 126 may be detected easily.

Figure 9:
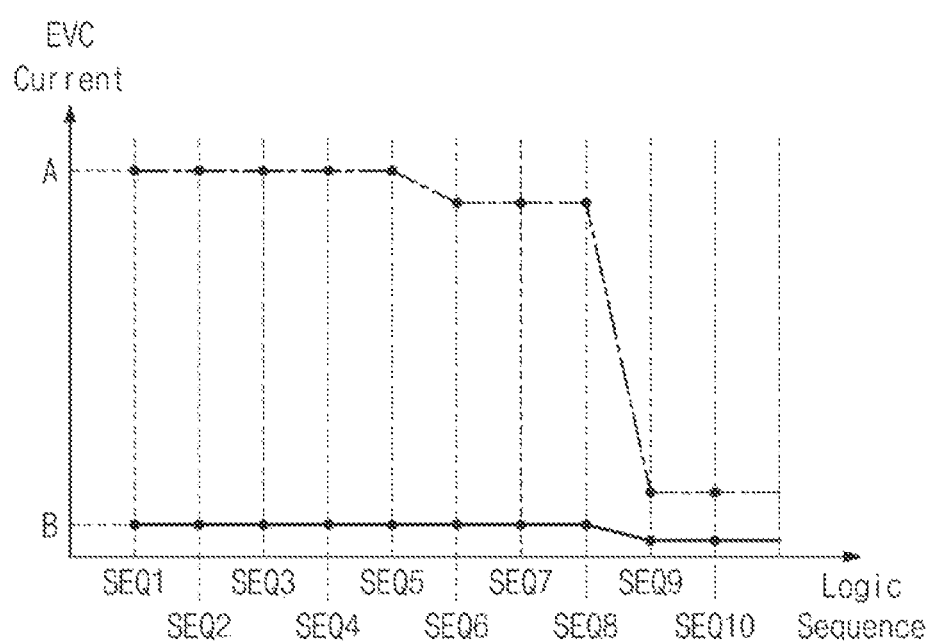
FIG. 9 is a graph illustrating a magnitude of an external current measured through a test operation of FIGS. 7 and 8, according to some embodiments.

FIG. 9 is a graph illustrating a magnitude of an external current measured through a test operation of FIGS. 7 and 8. In the graph of FIG. 9, a horizontal axis represents a logic sequence of the control logic circuit 126, and a vertical axis represents a magnitude of an external current. In the graph of FIG. 9, a dash-single dotted line represents the magnitude of the external current measured depending on the operation of the related art illustrated in FIG. 7, and a solid line represents the magnitude of the external current measured depending on the operation of FIG. 8 according to some embodiments.

Referring to FIGS. 1 and 8 to 9, the memory device 120 may perform the test operation under control of the test device 110. During the test operation, the control logic circuit 126 of the memory device 120 may sequentially perform a plurality of logic sequences SEQ1 to SEQ10. In an embodiment, the plurality of logic sequences SEQ1 to SEQ10 may be performed in synchronization with the clock signal CLK. In an embodiment, the plurality of logic sequences SEQ1 to SEQ10 may indicate operations of controlling various components of the memory device 120 during the operation of the memory device 120. For example, the plurality of logic sequences SEQ1 to SEQ10 may include various operations such as a page buffer initialization operation, a bit line precharge operation, a data dump operation, a sensing node develop operation, and a sensing node precharge operation. However, the present disclosure is not limited thereto. For example, each of the plurality of logic sequences SEQ1 to SEQ10 may include various operations necessary for the operation of the memory device 120.

While the control logic circuit 126 performs the plurality of logic sequences SEQ1 to SEQ10, the test device 110 may measure the external current of the external power EVC. In this case, according to the embodiment illustrated in FIG. 8, the external current has a magnitude of "B" being relatively small. A leakage current due to a defect (e.g., a metal line contact or a defect of a transistor) may be caused in the control logic circuit 126 of the memory device 120. The leakage current may have a relatively small magnitude (e.g., in units of several or tens of uA). By contrast, according to the related art illustrated in FIG. 7, the external current has a magnitude of "A" being relatively great. In this case, when the external current has the magnitude of "A" being relatively great, because a change rate of the external current due to the leakage current is relatively small, whether the leakage current occurs is not detected clearly. In contrast, according to some embodiments, when the external current has the magnitude of "B" being relatively small, because a change rate of the external current due to the leakage current is relatively great, whether the leakage current occurs is detected clearly. That is, the test device 110 may determine whether the memory device 120 is defective (or the control logic circuit 126 is defective), by determining whether the detected magnitude of the external current is greater than or equal to a threshold value.

Figure 10:
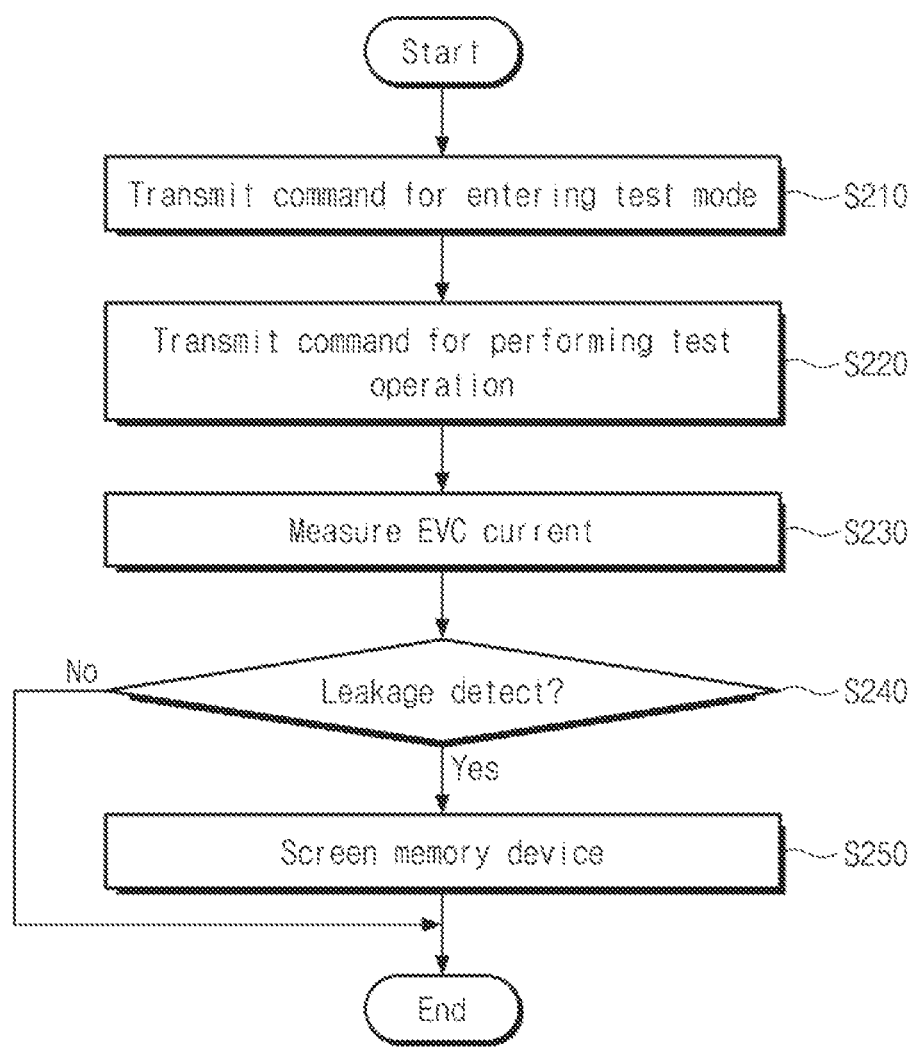
FIG. 10 is a flowchart illustrating an operation of a test device of FIG. 1, according to some embodiments.

FIG. 10 is a flowchart illustrating an operation of a test device of FIG. 1, according to some embodiments. Referring to FIGS. 1 and 10, in operation S210, the test device 110 may transmit a command for entering the test mode to the memory device 120. For example, the test device 110 may be configured to perform various test operations on the memory device 120. The memory device 120 may enter the test mode based on the command transmitted from the test device 110 to allow the memory device 120 to enter the test mode. For example, in some embodiments, the memory device 120 may enter the test mode in response to the command transmitted from the test device 110. In an embodiment, the command for entering the test mode may be a command defined in advance by the interface (e.g., a toggle NAND interface) of the memory device 120 or a vendor-specific command, or a combination of various commands.

In operation S220, the test device 110 may transmit a command for performing the test operation to the memory device 120. For example, the test device 110 may transmit the command to the memory device 120 such that there are performed various operations for testing the memory device 120. The memory device 120 may perform various operations for test based on the command from the test device 110. For example, in some embodiments, the memory device 120 may perform various operations for test in response to the command from the test device 110. In an embodiment, various operations for test may include normal memory operations of the memory device 120, such as a program operation, a read operation, and an erase operation. In some embodiments, various operations for test may include operations for detecting various defects of the memory device 120.

In an embodiment, while performing various operations for test, the memory device 120 may disable some of the components of the reference generating circuit 127. This configuration and operation is described with reference to FIGS. 2 to 9, and thus, additional description will be omitted to avoid redundancy and conciseness.

In operation S230, the test device 110 may measure the external current of the external power EVC. For example, the external power (EVC) current measuring circuit 111 of the test device 110 may measure the external current flowing through a signal line through which the external power EVC is provided.

In operation S240, the test device 110 may determine whether a leakage current is detected. For example, the test device 110 may determine whether the leakage current is detected, based on the measured magnitude of the external current. For example, when the measured magnitude of the external current exceeds a threshold value, the test device 110 may determine that the leakage current occurs. The threshold value may be preset or set experimentally.

When it is determined that the leakage current occurs (operation S240, Yes), in operation S250, the test device 110 may screen the memory device 120. For example, in some embodiments, the test device 110 may screen out the memory device 120 as defective. For example, that the leakage current occurs may mean that a defect is present in some (e.g., the control logic circuit 126) of the components of the memory device 120. That is, that the leakage current occurs means that the memory device 120 is defective. Since the memory device 120 that is defective is screened out by the test device 110, the memory device 120 may be prevented from be transported (or delivered) to a following process (e.g., a package process). Accordingly, the entire process yield may be improved. When it is determined that the leakage current does not occur (operation S240, No), the process ends and the memory device 120 passes and is not screened out.

Figure 11:
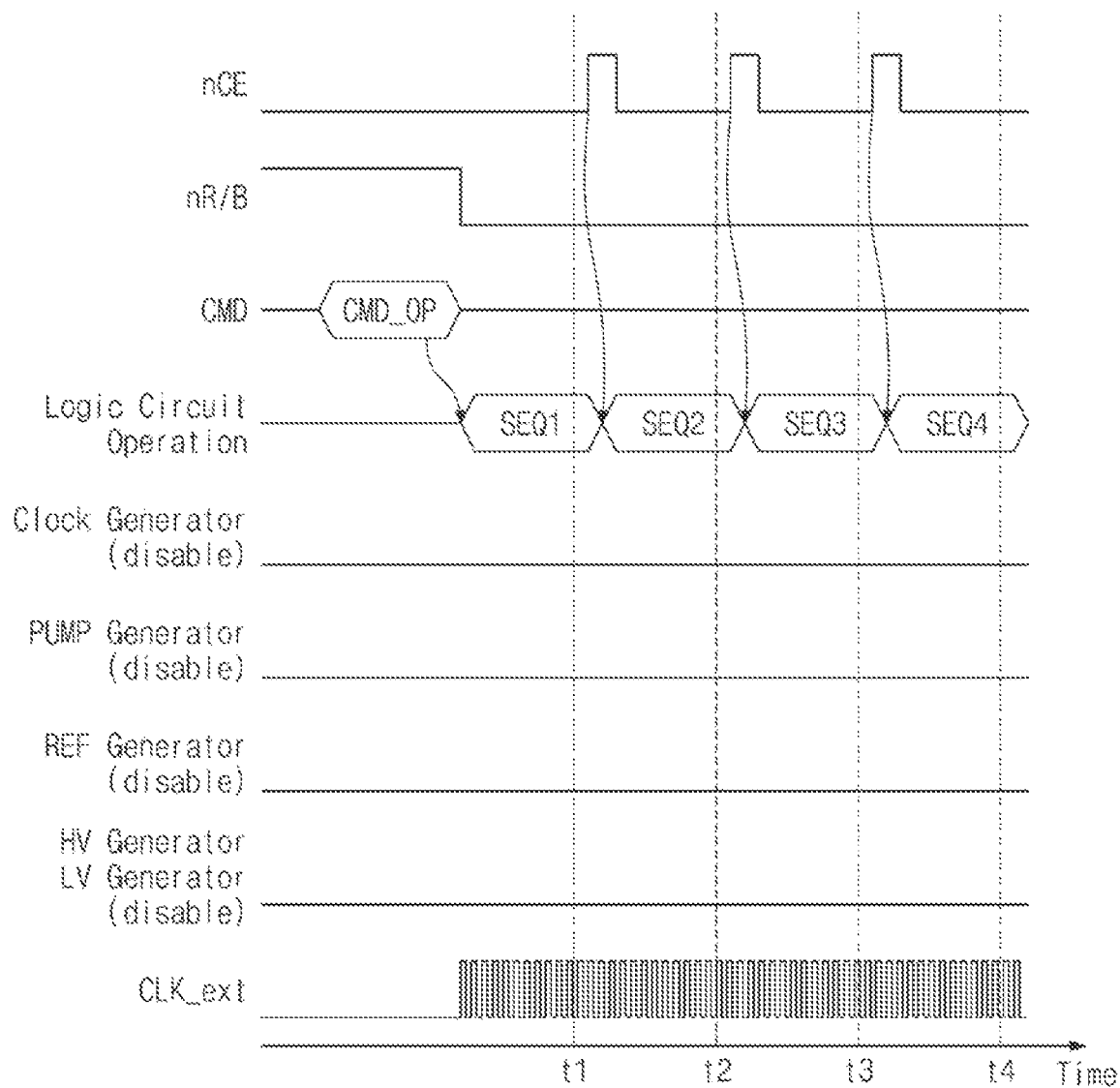
FIGS. 11 and 12 are timing diagrams illustrating a test operation of a memory device of FIG. 2, according to some embodiments.
Figure 12:
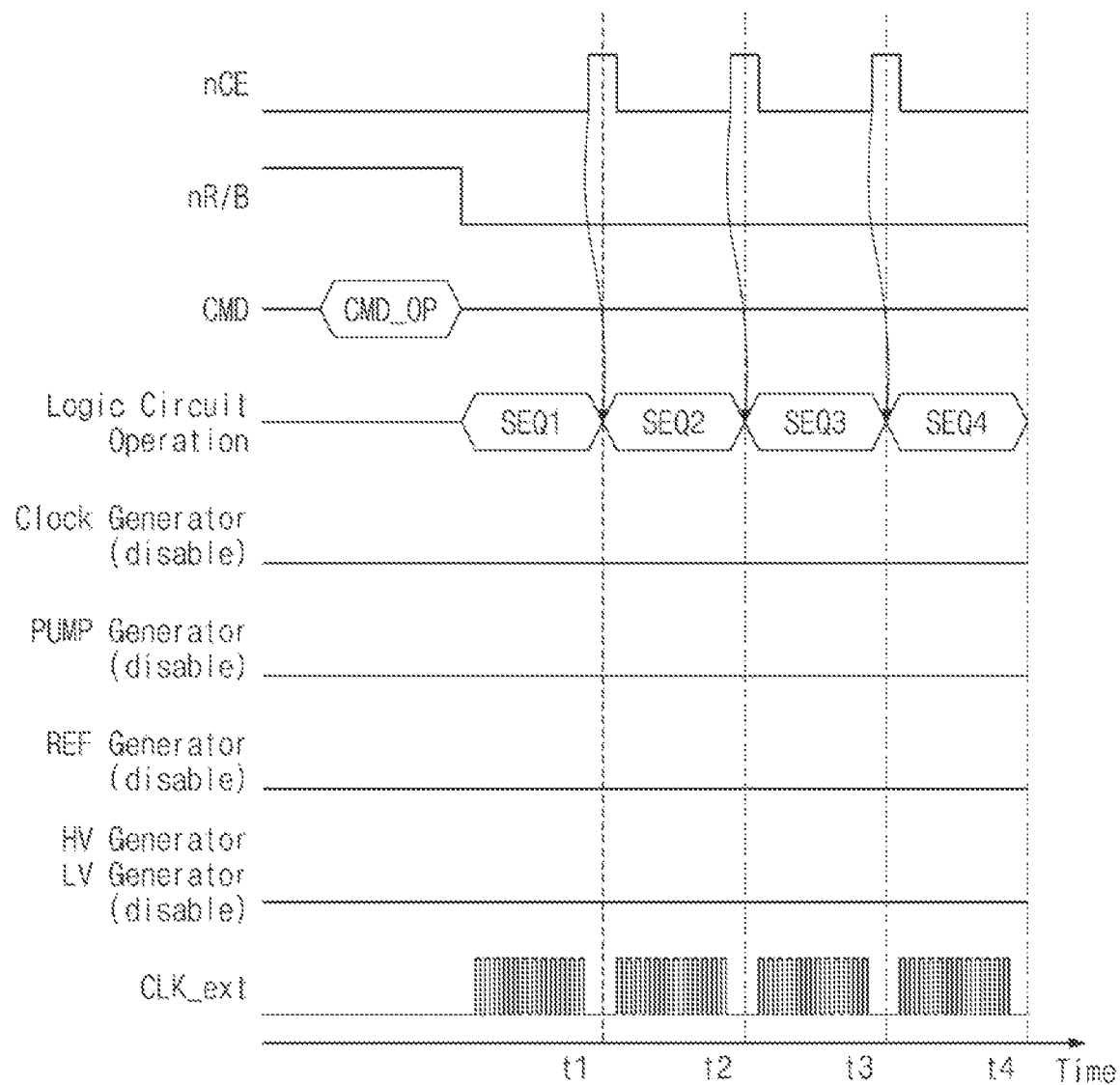

FIGS. 11 and 12 are timing diagrams illustrating a test operation of a memory device of FIG. 2, according to some embodiments. For convenience of description, additional description associated with the components and operations described with reference to FIG. 8 will be omitted to avoid redundancy and for conciseness. Referring to FIGS. 1, 2, 11, and 12, the memory device 120 may operate in the test mode under control of the test device 110. In an embodiment, the test mode may be a mode for detecting a defect of the control logic circuit 126. In an embodiment, the test mode may be implemented based on an external timed mode. According to the external timed mode, the control logic circuit 126 of the memory device 120 may sequentially perform the plurality of logic sequences SEQ1 to SEQ4 under control of the external device (e.g., the test device 110).

For example, as illustrated in FIGS. 11 and 12, in the test mode, the memory device 120 may receive the operation command CMD_OP from the test device 110. The control logic circuit 126 of the memory device 120 may perform the first logic sequence SEQ1 in response to the operation command CMD_OP. Next, the control logic circuit 126 of the memory device 120 may perform the second logic sequence SEQ2 in response to the first low-to-high transition (e.g., the first toggle) of the chip enable signal nCE from the test device 110. Then, the control logic circuit 126 of the memory device 120 may perform the third logic sequence SEQ3 in response to the second low-to-high transition (e.g., the second toggle) of the chip enable signal nCE from the test device 110. The control logic circuit 126 of the memory device 120 may perform the fourth logic sequence SEQ4 in response to the third low-to-high transition (e.g., the third toggle) of the chip enable signal nCE from the test device 110.

As described above, the control logic circuit 126 of the memory device 120 may sequentially perform the plurality of logic sequences SEQ1 to SEQ4 under control of the test device 110 (e.g., as the chip enable signal nCE sequentially toggles). In this case, a timing to measure the external current of the external power EVC may be secured in the test device 110.

In an embodiment, as described with reference to FIGS. 1 to 9, in the test mode, the memory device 120 may disable some of the components of the reference generating circuit 127. The memory device 120 may operate by using the internal power IVC generated from the reference generating circuit 127.

The memory device 120 may receive the external clock signal CLK_ext from the test device 110. In an embodiment, the external clock signal CLK_ext may be provided from the test device 110 through one of the control signals CTRL. In some embodiments, the external clock signal CLK_ext may be provided from the test device 110 through a separate dedicated line.

As illustrated in FIG. 11, the test device 110 may provide the external clock signal CLK_ext to the memory device 120, and the test device 110 may measure the external current in each of the plurality of logic sequences SEQ1 to SEQ4 of the control logic circuit 126. For example, as illustrated in FIG. 11, the test device 110 may measure the external current at each of first to fourth point in times t1 to t4.

In some embodiments, as illustrated in FIG. 12, the test device 110 may transmit the external clock signal CLK_ext, which is distinguished in units of logic sequence, to the memory device 120. In this case, the actual operation of the control logic circuit 126 may be determined by whether the external clock signal CLK_ext toggles. That is, the test device 110 may temporarily suspend the operation of the control logic circuit 126 by controlling the external clock signal CLK_ext. The test device 110 may measure the external current between two adjacent logic sequences among the plurality of logic sequences SEQ1 to SEQ4 of the control logic circuit 126. For example, as illustrated in FIG. 12, the test device 110 may measure the external current at each of the first to fourth point in times t1 to t4. In some embodiments, the test device 110 may periodically suspend the operation of the control logic circuit 126 by controlling the external clock signal CLK_ext.

In the embodiment of FIG. 11, the point in time (i.e., each of the first to fourth point in times t1 to t4) when the external current is measured may belong to a period where the logic sequence is performed (or a period where the chip enable signal nCE is at a logic low level). In contrast, in the embodiment of FIG. 12, the point in time (i.e., each of the first to fourth point in times t1 to t4) when the external current is measured may belong to a period where the logic sequence is completed or a period where the logic sequence is not actually performed (or a period where the chip enable signal nCE is at a logic high level). Compared to the embodiment of FIG. 11, according to the embodiment of FIG. 12, the test device 110 may selectively suspend the operation of the control logic circuit 126 by using the external clock signal CLK_ext. Accordingly, because the external current measured while the operation of the control logic circuit 126 is suspended is relatively smaller, the leakage current occurring in the control logic circuit 126 may be detected more accurately.

According to the above embodiments, the memory device 120 may perform the test operate under control of the test device 110. In this case, the memory device 120 may disable some of the components of the reference generating circuit 127 (e.g., the remaining generators other than the internal power driver 127*f*). According to the above condition, because the magnitude of the external current used in the memory device 120 is relatively small, the leakage current occurring in the control logic circuit 126 of the memory device 120 may be detected normally. Also, according to the above condition, because the internal clock signal CLK_in is not generated from the reference generating circuit 127, the control logic circuit 126 may fail to operate normally. To address the issue, according to some embodiments, the test device 110 may provide the memory device 120 with the external clock signal CLK_ext for a normal operation of the control logic circuit 126. Accordingly, the control logic circuit 126 of the memory device 120 may normally operate by using the external clock signal CLK_ext.

According to the above embodiments, in the test mode, the reference generating circuit 127 of the memory device 120 may not generate the internal clock signal CLK_in. However, the present disclosure is not limited thereto. For example, in the test mode, the memory device 120 may be provided with an additional external power independent of the external power EVC from the test device 110. The memory device 120 may generate the internal power IVC by using the external power EVC and may generate the internal clock signal CLK_in by using the additional external power. The memory device 120 may disable the remaining components (e.g., the remaining components other than components generating the internal power IVC and the internal clock signal CLK_in) of the reference generating circuit 127. In this case, the control logic circuit 126 may operate normally by using the internal power IVC and the internal clock signal CLK_in. The test device 110 may measure the external current of the external power EVC and may determine whether the memory device 120 is defective, based on the measured external current. Even though the internal clock signal CLK_in is generated in the memory device 120, because the internal clock signal CLK_in is generated based on a separate external power, the magnitude of the external current of the external power EVC may be relatively small to be similar to that of the above embodiments. Accordingly, the leakage current occurring in the control logic circuit 126 of the memory device 120 may be detected normally.

Figure 13:
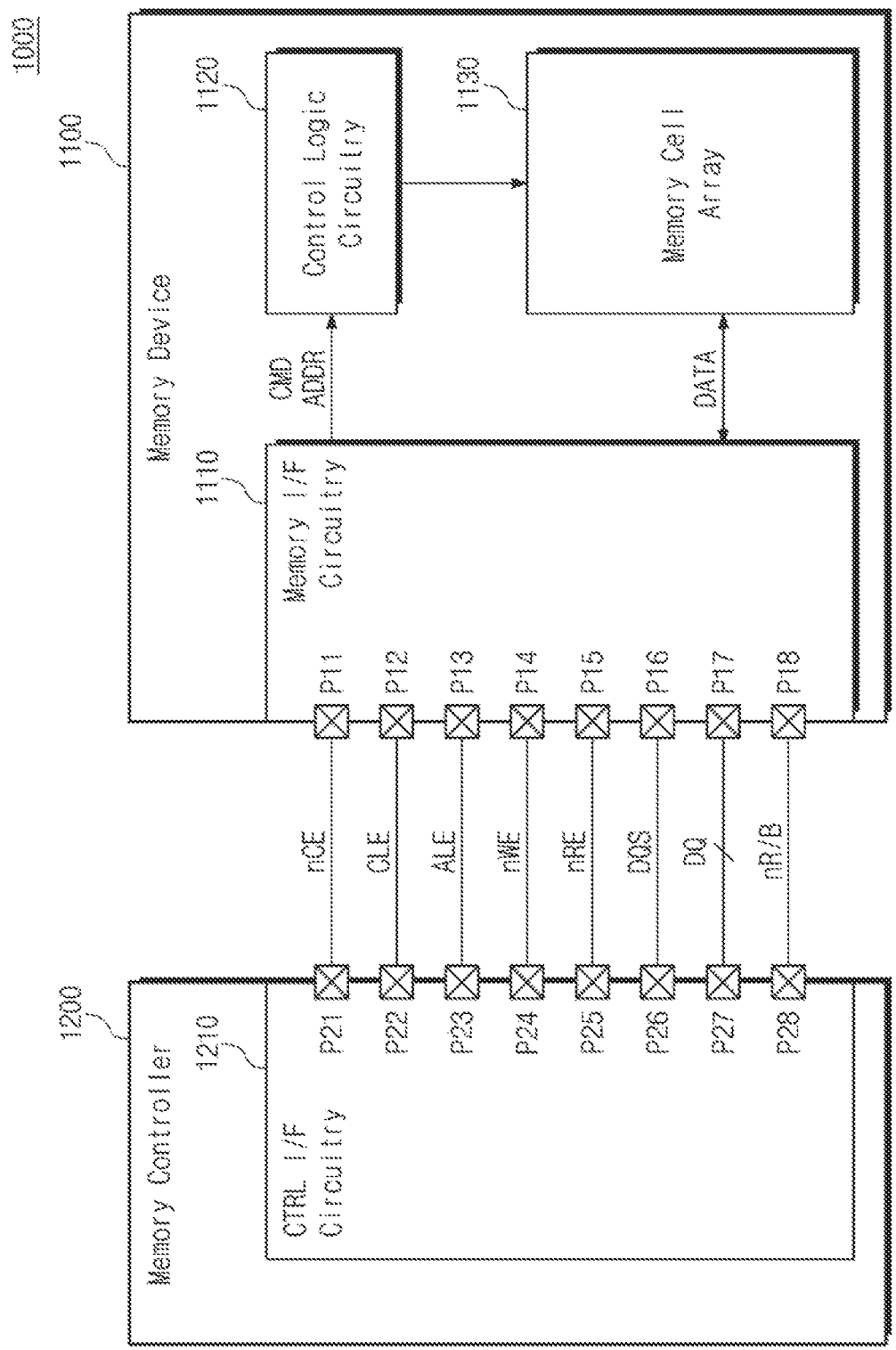
FIG. 13 is a block diagram illustrating a memory system according to some embodiments.

FIG. 13 is a block diagram of a memory system 1000 according to an embodiment. Referring to FIG. 13, the memory system 1000 may include a memory device 1100 and a memory controller 1200. In some embodiments, the memory device 1100 may be a non-volatile memory (NVM) device. The memory device 1100 may include first to eighth pins P11 to P18, a memory interface (I/F) circuitry 1110, a control logic circuitry 1120, and a memory cell array 1130.

The memory interface circuitry 1110 may receive a chip enable signal nCE from the memory controller 1200 through the first pin P11. The memory interface circuitry 1110 may transmit and receive signals to and from the memory controller 1200 through the second to eighth pins P12 to P18 in response to the chip enable signal nCE. For example, when the chip enable signal nCE is in an enable state (e.g., a low level), the memory interface circuitry 1110 may transmit and receive signals to and from the memory controller 1200 through the second to eighth pins P12 to P18.

The memory interface circuitry 1110 may receive a command latch enable signal CLE, an address latch enable signal ALE, and a write enable signal nWE from the memory controller 1200 through the second to fourth pins P12 to P14. The memory interface circuitry 1110 may receive a data signal DQ from the memory controller 1200 through the seventh pin P17 or transmit the data signal DQ to the memory controller 1200. A command CMD, an address ADDR, and data may be transmitted via the data signal DQ. For example, the data signal DQ may be transmitted through a plurality of data signal lines. In this case, the seventh pin P17 may include a plurality of pins respectively corresponding to a plurality of data signals DQ(s).

The memory interface circuitry 1110 may obtain the command CMD from the data signal DQ, which is received in an enable section (e.g., a high-level state) of the command latch enable signal CLE based on toggle time points of the write enable signal nWE. The memory interface circuitry 1110 may obtain the address ADDR from the data signal DQ, which is received in an enable section (e.g., a high-level state) of the address latch enable signal ALE based on the toggle time points of the write enable signal nWE.

In an example embodiment, the write enable signal nWE may be maintained at a static state (e.g., a high level or a low level) and toggle between the high level and the low level. For example, the write enable signal nWE may toggle in a section in which the command CMD or the address ADDR is transmitted. Thus, the memory interface circuitry 1110 may obtain the command CMD or the address ADDR based on toggle time points of the write enable signal nWE.

The memory interface circuitry 1110 may receive a read enable signal nRE from the memory controller 1200 through the fifth pin P15. The memory interface circuitry 1110 may receive a data strobe signal DQS from the memory controller 1200 through the sixth pin P16 or transmit the data strobe signal DQS to the memory controller 1200.

In a data (DATA) output operation of the memory device 1100, the memory interface circuitry 1110 may receive the read enable signal nRE, which toggles through the fifth pin P15, before outputting the data DATA. The memory interface circuitry 1110 may generate the data strobe signal DQS, which toggles based on the toggling of the read enable signal nRE. For example, the memory interface circuitry 1110 may generate a data strobe signal DQS, which starts toggling after a predetermined delay (e.g., tDQSRE), based on a toggling start time of the read enable signal nRE. The memory interface circuitry 1110 may transmit the data signal DQ including the data DATA based on a toggle time point of the data strobe signal DQS. Thus, the data DATA may be aligned with the toggle time point of the data strobe signal DQS and transmitted to the memory controller 1200.

In a data (DATA) input operation of the memory device 1100, when the data signal DQ including the data DATA is received from the memory controller 1200, the memory interface circuitry 1110 may receive the data strobe signal DQS, which toggles, along with the data DATA from the memory controller 1200. The memory interface circuitry 1110 may obtain the data DATA from the data signal DQ based on toggle time points of the data strobe signal DQS. For example, the memory interface circuitry 1110 may sample the data signal DQ at rising and falling edges of the data strobe signal DQS and obtain the data DATA.

The memory interface circuitry 1110 may transmit a ready/busy output signal nR/B to the memory controller 1200 through the eighth pin P18. The memory interface circuitry 1110 may transmit state information of the memory device 1100 through the ready/busy output signal nR/B to the memory controller 1200. When the memory device 1100 is in a busy state (i.e., when operations are being performed in the memory device 1100), the memory interface circuitry 1110 may transmit a ready/busy output signal nR/B indicating the busy state to the memory controller 1200. When the memory device 1100 is in a ready state (i.e., when operations are not performed or completed in the memory device 1100), the memory interface circuitry 1110 may transmit a ready/busy output signal nR/B indicating the ready state to the memory controller 1200. For example, while the memory device 1100 is reading data DATA from the memory cell array 1130 in response to a page read command, the memory interface circuitry 1110 may transmit a ready/busy output signal nR/B indicating a busy state (e.g., a low level) to the memory controller 1200. For example, while the memory device 1100 is programming data DATA to the memory cell array 1130 in response to a program command, the memory interface circuitry 1110 may transmit a ready/busy output signal nR/B indicating the busy state to the memory controller 1200.

The control logic circuitry 1120 may control all operations of the memory device 1100. The control logic circuitry 1120 may receive the command/address CMD/ADDR obtained from the memory interface circuitry 1110. The control logic circuitry 1120 may generate control signals for controlling other components of the memory device 1100 in response to the received command/address CMD/ADDR. For example, the control logic circuitry 1120 may generate various control signals for programming data DATA to the memory cell array 1130 or reading the data DATA from the memory cell array 1130.

The memory cell array 1130 may store the data DATA obtained from the memory interface circuitry 1110, via the control of the control logic circuitry 1120. The memory cell array 1130 may output the stored data DATA to the memory interface circuitry 1110 via the control of the control logic circuitry 1120.

The memory cell array 1130 may include a plurality of memory cells. For example, the plurality of memory cells may be flash memory cells. However, the inventive concept is not limited thereto, and the memory cells may be RRAM cells, FRAM cells, PRAM cells, thyristor RAM (TRAM) cells, or MRAM cells. Hereinafter, an embodiment in which the memory cells are NAND flash memory cells will mainly be described.

The memory controller 1200 may include first to eighth pins P21 to P28 and a controller interface (I/F) circuitry 1210. The first to eighth pins P21 to P28 may respectively correspond to the first to eighth pins P11 to P18 of the memory device 1100.

The controller interface circuitry 1210 may transmit a chip enable signal nCE to the memory device 1100 through the first pin P21. The controller interface circuitry 1210 may transmit and receive signals to and from the memory device 1100, which is selected by the chip enable signal nCE, through the second to eighth pins P22 to P28.

The controller interface circuitry 1210 may transmit the command latch enable signal CLE, the address latch enable signal ALE, and the write enable signal nWE to the memory device 1100 through the second to fourth pins P22 to P24. The controller interface circuitry 1210 may transmit or receive the data signal DQ to and from the memory device 1100 through the seventh pin P27.

The controller interface circuitry 1210 may transmit the data signal DQ including the command CMD or the address ADDR to the memory device 1100 along with the write enable signal nWE, which toggles. The controller interface circuitry 1210 may transmit the data signal DQ including the command CMD to the memory device 1100 by transmitting a command latch enable signal CLE having an enable state. Also, the controller interface circuitry 1210 may transmit the data signal DQ including the address ADDR to the memory device 1100 by transmitting an address latch enable signal ALE having an enable state.

The controller interface circuitry 1210 may transmit the read enable signal nRE to the memory device 1100 through the fifth pin P25. The controller interface circuitry 1210 may receive or transmit the data strobe signal DQS from or to the memory device 1100 through the sixth pin P26.

In a data (DATA) output operation of the memory device 1100, the controller interface circuitry 1210 may generate a read enable signal nRE, which toggles, and transmit the read enable signal nRE to the memory device 1100. For example, before outputting data DATA, the controller interface circuitry 1210 may generate a read enable signal nRE, which is changed from a static state (e.g., a high level or a low level) to a toggling state. Thus, the memory device 1100 may generate a data strobe signal DQS, which toggles, based on the read enable signal nRE. The controller interface circuitry 1210 may receive the data signal DQ including the data DATA along with the data strobe signal DQS, which toggles, from the memory device 1100. The controller interface circuitry 1210 may obtain the data DATA from the data signal DQ based on a toggle time point of the data strobe signal DQS.

In a data (DATA) input operation of the memory device 1100, the controller interface circuitry 1210 may generate a data strobe signal DQS, which toggles. For example, before transmitting data DATA, the controller interface circuitry 1210 may generate a data strobe signal DQS, which is changed from a static state (e.g., a high level or a low level) to a toggling state. The controller interface circuitry 1210 may transmit the data signal DQ including the data DATA to the memory device 1100 based on toggle time points of the data strobe signal DQS.

The controller interface circuitry 1210 may receive a ready/busy output signal nR/B from the memory device 1100 through the eighth pin P28. The controller interface circuitry 1210 may determine state information of the memory device 1100 based on the ready/busy output signal nR/B.

In an embodiment, the memory device 1100 of FIG. 13 may be the memory device 120 described with reference to FIGS. 1 to 12. The memory device 1100 may be tested based on the method described with reference to FIGS. 1 to 12 under control of a separate test device. In an embodiment, during the test operation of the memory device 1100, an external clock signal (e.g., CLK_ext) that is provided to the control logic circuitry 1120 may be supplied through the read enable signal nRE. However, the present disclosure is not limited thereto. For example, in some embodiments, the external clock signal may be provided to the memory device 1100 through any other control signals (e.g., nCE, CLE, ALE, nWE, DQS, and DQ) or any other dedicated signal line.

Figure 14:
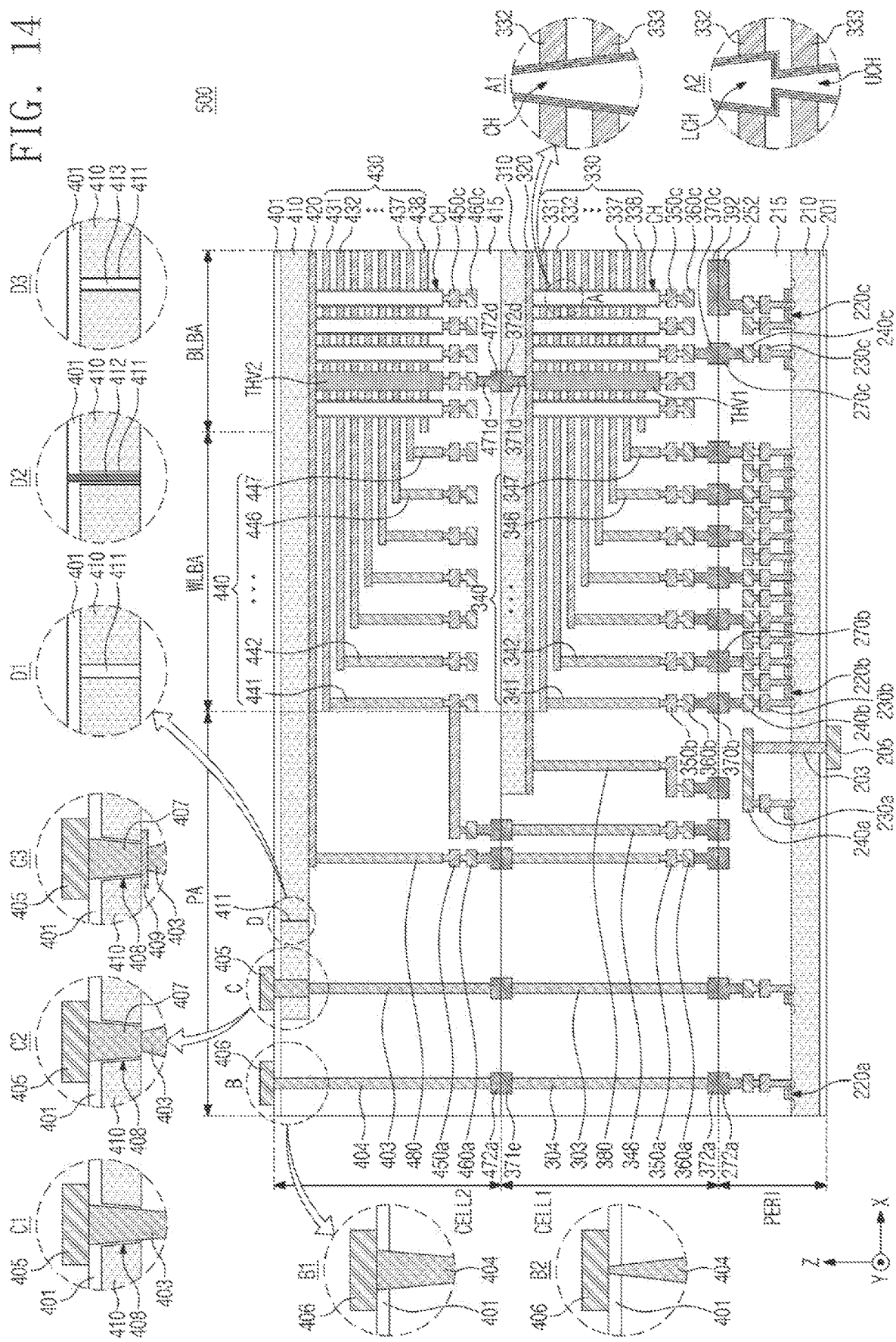
FIG. 14 is a view for describing a memory device according to some embodiments.

FIG. 14 is a view for describing a memory device 500 according to some embodiments.

Referring to FIG. 14, the memory device 500 may have a chip-to-chip (C2C) structure. Herein, in the C2C structure, after fabricating at least one upper chip including a cell region CELL and at least one lower chip including a peripheral circuit region PERI, respectively, the upper chip and the lower chip may be bonded to each other by a bonding method. As an example, the bonding method may mean a method of electrically or physically connecting a bonding metal pattern formed in the uppermost metal layer of the upper chip and a bonding metal pattern formed in the uppermost metal layer of the lower chip. For example, when the bonding metal patterns are formed of copper (Cu), the bonding method may be referred to as a "Cu—Cu bonding method". As another example, the bonding metal patterns may also be formed of aluminum (Al) or tungsten (W).

The memory device 500 may include at least one upper chip including a cell region. For example, as illustrated in FIG. 14, the memory device 500 may be implemented to include two upper chips. However, this is illustrative, and the number of upper chips is not limited thereto. In the case in which the memory device 500 is implemented to include two upper chips, the memory device 500 may be manufactured by separately manufacturing a first upper chip including a first cell region CELL1, a second upper chip including a second cell region CELL2, and a lower chip including a peripheral circuit region PERI and thereafter connecting the first upper chip, the second upper chip, and the lower chip by a bonding method. The first upper chip may be turned over and connected to the lower chip by the bonding method, and the second upper chip may also be turned over and connected to the first upper chip by the bonding method. In the following description, upper portions and lower portions of the first and second upper chips are defined based on before the first upper chip and the second upper chip are turned over. That is, in FIG. 14, an upper portion of the lower chip refers to an upper portion defined based on a +Z-axis direction, and the upper portions of the first and second upper chips refer to upper portions defined based on a −Z-axis direction. However, this is illustrative, and only one of the first upper chip and the second upper chip may be turned over and connected by the bonding method.

Each of the peripheral circuit region PERI and the first and second cell regions CELL1 and CELL2 of the memory device 500 may include an external pad bonding region PA, a word line bonding region WLBA, and a bit line bonding region BLBA.

The peripheral circuit region PERI may include a first substrate 210 and a plurality of circuit elements 220*a*, 220*b*, and 220*c* formed on the first substrate 210. An interlayer insulating layer 215 including one or more insulating layers may be provided on the plurality of circuit elements 220*a*, 220*b*, and 220*c*, and a plurality of metal lines connecting the plurality of circuit elements 220*a*, 220*b*, and 220*c* may be provided in the interlayer insulating layer 215. For example, the plurality of metal lines may include first metal lines 230*a*, 230*b*, and 230*c* connected with the plurality of circuit elements 220*a*, 220*b*, and 220*c*, respectively, and second metal lines 240*a*, 240*b*, and 240*c* formed on the first metal lines 230*a*, 230*b*, and 230*c*. The plurality of metal lines may be formed of at least one of various conductive materials. For example, the first metal lines 230*a*, 230*b*, and 230*c* may be formed of tungsten having a relatively high electrical resistivity, and the second metal lines 240*a*, 240*b*, and 240*c* may be formed of copper having a relatively low electrical resistivity.

In this specification, only the first metal lines 230*a*, 230*b*, and 230*c* and the second metal lines 240*a*, 240*b*, and 240*c* are illustrated and described for conciseness. However, without being limited thereto, one or more additional metal lines may be further formed on the second metal lines 240*a*, 240*b*, and 240*c*. In this case, the second metal lines 240*a*, 240*b*, and 240*c* may be formed of aluminum At least some of the additional metal lines formed on the second metal lines 240*a*, 240*b*, and 240*c* may be formed of copper having a lower electrical resistivity than the aluminum of the second metal lines 240*a*, 240*b*, and 240*c*.

The interlayer insulating layer 115 may be disposed on the first substrate 210 and may include an insulating material, such as silicon oxide or silicon nitride.

Each of the first and second cell regions CELL1 and CELL2 may include at least one memory block. The first cell region CELL1 may include a second substrate 310 and a common source line 320. A plurality of word lines 330 (331 to 338) may be stacked on the second substrate 310 in a direction (the Z-axis direction) perpendicular to an upper surface of the second substrate 310. String selection lines and a ground selection line may be disposed on and under the word lines 330, and the plurality of word lines 330 may be disposed between the string selection lines and the ground selection line. Likewise, the second cell region CELL2 may include a third substrate 410 and a common source line 420, and a plurality of word lines 430 (431 to 438) may be stacked in a direction (the Z-axis direction) perpendicular to an upper surface of the third substrate 410. The second substrate 310 and the third substrate 410 may be formed of various materials and may be, for example, silicon substrates, silicon-germanium substrates, germanium substrates, or substrates having mono-crystalline epitaxial layers grown on mono-crystalline silicon substrates. A plurality of channel structures CH may be formed in the first and second cell regions CELL1 and CELL2.

In an embodiment, as illustrated in A1, the channel structure CH may be provided in the bit line bonding region BLBA and may extend in the direction perpendicular to the upper surface of the second substrate 310 to penetrate the word lines 330, the string selection lines, and the ground selection line. The channel structure CH may include a data storage layer, a channel layer, and a buried insulating layer. The channel layer may be electrically connected with a first metal line 350c and a second metal line 360c in the bit line bonding region BLBA. For example, the second metal line 360c may be a bit line and may be connected to the channel structure CH through the first metal line 350c. The bit line 360c may extend in a first direction (a Y-axis direction) parallel to the upper surface of the second substrate 310.

In an embodiment, as illustrated in A2, the channel structure CH may include a lower channel LCH and an upper channel UCH connected to each other. For example, the channel structure CH may be formed through a process for the lower channel LCH and a process for the upper channel UCH. The lower channel LCH may extend in the direction perpendicular to the upper surface of the second substrate 310 and may penetrate the common source line 320 and the lower word lines 331 and 332. The lower channel LCH may include a data storage layer, a channel layer, and a buried insulating layer and may be connected with the upper channel UCH. The upper channel UCH may penetrate the upper word lines 333 to 338. The upper channel UCH may include a data storage layer, a channel layer, and a buried insulating layer, and the channel layer of the upper channel UCH may be electrically connected with the first metal line 350c and the second metal line 360c. As the length of a channel is increased, it may be difficult to form a channel having a constant width due to process reasons. The memory device 500 according to some embodiments may include a channel having improved width uniformity through the lower channel LCH and the upper channel UCH formed by sequential processes.

In the case in which the channel structure CH includes the lower channel LCH and the upper channel UCH as illustrated in A2, a word line located near the boundary between the lower channel LCH and the upper channel UCH may be a dummy word line. For example, the word line 332 and the word line 333 that form the boundary between the lower channel LCH and the upper channel UCH may be dummy word lines. In this case, data may not be stored in memory cells connected to the dummy word lines. Alternatively, the number of pages corresponding to the memory cells connected to the dummy word lines may be smaller than the number of pages corresponding to memory cells connected to normal word lines. A voltage level applied to the dummy word lines may differ from a voltage level applied to the normal word lines, and thus an influence of a non-uniform channel width between the lower channel LCH and the upper channel UCH on an operation of the memory device may be reduced.

It is illustrated in A2 that the number of lower word lines 331 and 332 penetrated by the lower channel LCH is smaller than the number of upper word lines 333 to 338 penetrated by the upper channel UCH. However, this is illustrative, and the present disclosure is not limited thereto. In another example, the number of lower word lines penetrated by the lower channel LCH may be equal to or larger than the number of upper word lines penetrated by the upper channel UCH. Furthermore, the above-described structure and connection relationship of the channel structure CH disposed in the first cell region CELL1 may be identically applied to the channel structure CH disposed in the second cell region CELL2.

In the bit line bonding region BLBA, a first through-electrode THV1 may be provided in the first cell region CELL1, and a second through-electrode THV2 may be provided in the second cell region CELL2. As illustrated in FIG. 14, the first through-electrode THV1 may penetrate the common source line 320 and the plurality of word lines 330. However, this is illustrative, and the first through-electrode THV1 may additionally penetrate the second substrate 310. The first through-electrode THV1 may include a conductive material. Alternatively, the first through-electrode THV1 may include a conductive material surrounded by an insulating material. The second through-electrode THV2 may have the same shape and structure as the first through-electrode THV1.

In an embodiment, the first through-electrode THV1 and the second through-electrode THV2 may be electrically connected through a first through-metal pattern 372d and a second through-metal pattern 472d. The first through-metal pattern 372d may be formed on a lower side of the first upper chip including the first cell region CELL1, and the second through-metal pattern 472d may be formed on an upper side of the second upper chip including the second cell region CELL2. The first through-electrode THV1 may be electrically connected with the first metal line 350c and the second metal line 360c. A lower VIA 371d may be formed between the first through-electrode THV1 and the first through-metal pattern 372d, and an upper VIA 471d may be formed between the second through-electrode THV2 and the second through-metal pattern 472d. The first through-metal pattern 372d and the second through-metal pattern 472d may be connected by a bonding method.

Furthermore, in the bit line bonding region BLBA, an upper metal pattern 252 may be formed on the uppermost metal layer of the peripheral circuit region PERI, and an upper metal pattern 392 having the same shape as the upper metal pattern 252 may be formed on the uppermost metal layer of the first cell region CELL1. The upper metal pattern 392 of the first cell region CELL1 and the upper metal pattern 252 of the peripheral circuit region PERI may be electrically connected to each other by a bonding method. In the bit line bonding region BLBA, the bit line 360c may be electrically connected with a page buffer included in the peripheral circuit region PERI. For example, some of the circuit elements 220c of the peripheral circuit region PERI may provide a page buffer, and the bit line 360c may be electrically connected with the circuit elements 220c providing the page buffer through an upper bonding metal 370c of the first cell region CELL1 and an upper bonding metal 270c of the peripheral circuit region PERI.

In the word line bonding region WLBA, the word lines 330 of the first cell region CELL1 may extend in a second direction (an X-axis direction) parallel to the upper surface of the second substrate 310 and may be connected with a plurality of cell contact plugs 340 (341 to 347). A first metal line 350b and a second metal line 360b may be sequentially connected to upper portions of the cell contact plugs 340 connected to the word lines 330. In the word line bonding region WLBA, the cell contact plugs 340 may be connected with the peripheral circuit region PERI through an upper bonding metal 370b of the first cell region CELL1 and an upper bonding metal 270b of the peripheral circuit region PERI.

The cell contact plugs 340 may be electrically connected with a row decoder included in the peripheral circuit region PERI. For example, some of the circuit elements 220b of the peripheral circuit region PERI may provide a row decoder, and the cell contact plugs 340 may be electrically connected with the circuit elements 220b providing the row decoder through the upper bonding metal 370b of the first cell region CELL1 and the upper bonding metal 270b of the peripheral circuit region PERI. In an embodiment, an operating voltage of the circuit elements 220b that provide the row decoder may differ from an operating voltage of the circuit elements 220c that provide the page buffer. For example, the operating voltage of the circuit elements 220c that provide the page buffer may be greater than the operating voltage of the circuit elements 220b that provide the row decoder.

Likewise, in the word line bonding region WLBA, the word lines 430 of the second cell region CELL2 may extend in the second direction (the X-axis direction) parallel to the upper surface of the third substrate 410 and may be connected with a plurality of cell contact plugs 440 (441 to 447). The cell contact plugs 440 may be connected with the peripheral circuit region PERI through an upper metal pattern of the second cell region CELL2, a lower metal pattern and an upper metal pattern of the first cell region CELL1, and a cell contact plug 348.

In the word line bonding region WLBA, the upper bonding metal 370b may be formed in the first cell region CELL1, and the upper bonding metal 270b may be formed in the peripheral circuit region PERI. The upper bonding metal 370b of the first cell region CELL1 and the upper bonding metal 270b of the peripheral circuit region PERI may be electrically connected to each other by a bonding method. The upper bonding metal 370b and the upper bonding metal 270b may be formed of aluminum, copper, or tungsten.

In the external pad bonding region PA, a lower metal pattern 371e may be formed on a lower portion of the first cell region CELL1, and an upper metal pattern 472a may be formed on an upper portion of the second cell region CELL2. The lower metal pattern 371e of the first cell region CELL1 and the upper metal pattern 472a of the second cell region CELL2 may be connected by a bonding method in the external pad bonding region PA. Likewise, an upper metal pattern 372a may be formed on an upper portion of the first cell region CELL1, and an upper metal pattern 272a may be formed on an upper portion of the peripheral circuit region PERI. The upper metal pattern 372a of the first cell region CELL1 and the upper metal pattern 272a of the peripheral circuit region PERI may be connected to each other by a bonding method.

Common source line contact plugs 380 and 480 may be disposed in the external pad bonding region PA. The common source line contact plugs 380 and 480 may be formed of a conductive material, such as metal, a metal compound, or doped poly-silicon. The common source line contact plug 380 of the first cell region CELL1 may be electrically connected with the common source line 320, and the common source line contact plug 480 of the second cell region CELL2 may be electrically connected with the common source line 420. A first metal line 350a and a second metal line 360a may be sequentially stacked on an upper portion of the common source line contact plug 380 of the first cell region CELL1, and a first metal line 450a and a second metal line 460a may be sequentially stacked on an upper portion of the common source line contact plug 480 of the second cell region CELL2.

Input/output pads 205, 405, and 406 may be disposed in the external pad bonding region PA. Referring to FIG. 14, a lower insulating layer 201 may cover a lower surface of the first substrate 210, and the first input/output pad 205 may be formed on the lower insulating layer 201. The first input/output pad 205 may be connected with at least one of the plurality of circuit elements 220a disposed in the peripheral circuit region PERI through a first input/output contact plug 203 and may be separated from the first substrate 210 by the lower insulating layer 201. In addition, a side insulating layer may be disposed between the first input/output contact plug 203 and the first substrate 210 and may electrically isolate the first input/output contact plug 203 from the first substrate 210.

An upper insulating layer 401 may be formed on the third substrate 410 to cover the upper surface of the third substrate 410. The second input/output pad 405 and/or the third input/output pad 406 may be disposed on the upper insulating layer 401. The second input/output pad 405 may be connected with at least one of the plurality of circuit elements 220a disposed in the peripheral circuit region PERI through second input/output contact plugs 403 and 303, and the third input/output pad 406 may be connected with at least one of the plurality of circuit elements 220a disposed in the peripheral circuit region PERI through third input/output contact plugs 404 and 304.

In an embodiment, the third substrate 410 may not be disposed in the regions in which the input/output contact plugs are disposed. For example, as illustrated in B, the third input/output contact plug 404 may be separated from the third substrate 410 in a direction parallel to the upper surface of the third substrate 410, may penetrate an interlayer insulating layer 415 of the second cell region CELL2, and may be connected to the third input/output pad 406. In this case, the third input/output contact plug 404 may be formed through various processes.

For example, as illustrated in B1, the third input/output contact plug 404 may extend in the third direction (the Z-axis direction) and may have an increasing diameter toward the upper insulating layer 401. That is, while the channel structure CH described with reference to A1 has a decreasing diameter toward the upper insulating layer 401, the third input/output contact plug 404 may have an increasing diameter toward the upper insulating layer 401. For example, the third input/output contact plug 404 may be formed after the second cell region CELL2 and the first cell region CELL1 are coupled by a bonding method.

For example, as illustrated in B2, the third input/output contact plug 404 may extend in the third direction (the Z-axis direction) and may have a decreasing diameter toward the upper insulating layer 401. That is, likewise to the channel structure CH, the third input/output contact plug 404 may have a decreasing diameter toward the upper insulating layer 401. For example, the third input/output contact plug 404 may be formed together with the cell contact plugs 440 before the second cell region CELL2 and the first cell region CELL1 are coupled by a bonding method.

In an embodiment, an input/output contact plug may be disposed to overlap the third substrate 410. For example, as illustrated in C, the second input/output contact plug 403 may be formed through the interlayer insulating layer 415 of the second cell region CELL2 in the third direction (the Z-axis direction) and may be electrically connected to the second input/output pad 405 through the third substrate 410. In this case, a connection structure of the second input/output contact plug 403 and the second input/output pad 405 may be implemented in various ways.

For example, as illustrated in C1, an opening 408 may be formed through the third substrate 410, and the second input/output contact plug 403 may be directly connected to the second input/output pad 405 through the opening 408 formed in the third substrate 410. In this case, as illustrated in C1, the second input/output contact plug 403 may have an increasing diameter toward the second input/output pad 405. However, this is illustrative, and the second input/output contact plug 403 may have a decreasing diameter toward the second input/output pad 405.

For example, as illustrated in C2, the opening 408 may be formed through the third substrate 410, and a contact 407 may be formed in the opening 408. One end portion of the contact 407 may be connected to the second input/output pad 405, and an opposite end portion of the contact 407 may be connected to the second input/output contact plug 403. Accordingly, the second input/output contact plug 403 may be electrically connected to the second input/output pad 405 through the contact 407 in the opening 408. In this case, as illustrated in C2, the contact 407 may have an increasing diameter toward the second input/output pad 405, and the second input/output contact plug 403 may have a decreasing diameter toward the second input/output pad 405. For example, the third input/output contact plug 403 may be formed together with the cell contact plugs 440 before the second cell region CELL2 and the first cell region CELL1 are coupled by a bonding method, and the contact 407 may be formed after the second cell region CELL2 and the first cell region CELL1 are coupled by the bonding method.

For example, as illustrated in C3, a stopper 409 may be additionally formed on an upper surface of the opening 408 of the third substrate 410. The stopper 409 may be a metal line formed on the same layer as the common source line 420. However, this is illustrative, and the stopper 409 may be a metal line formed on the same layer as at least one of the word lines 430. The second input/output contact plug 403 may be electrically connected to the second input/output pad 405 through the contact 407 and the stopper 409.

Similarly to the second and third input/output contact plugs 403 and 404 of the second cell region CELL2, the second and third input/output contact plugs 303 and 304 of the first cell region CELL1 may have a decreasing diameter toward the lower metal pattern 371e, or may have an increasing diameter toward the lower metal pattern 371e.

In some embodiments, a slit 411 may be formed in the third substrate 410. For example, the slit 411 may be formed at any position in the external pad bonding region PA. For example, as illustrated in D, the slit 411 may be located between the second input/output pad 405 and the cell contact plugs 440 when viewed on a plane. However, this is illustrative, and the slit 411 may be formed such that the second input/output pad 405 is located between the slit 411 and the cell contact plugs 440 when viewed on the plane.

For example, as illustrated in D1, the slit 411 may be formed through the third substrate 410. For example, the slit 411 may be used to prevent the third substrate 410 from being finely cracked when the opening 408 is formed. However, this is illustrative, and the slit 411 may be formed to have a depth ranging from about 60% to about 70% of the thickness of the third substrate 410.

For example, as illustrated in D2, a conductive material 412 may be formed in the slit 411. For example, the conductive material 412 may be used to discharge a leakage current generated while circuit elements in the external pad bonding region PA are driven. In this case, the conductive material 412 may be connected to an external ground line.

For example, as illustrated in D3, an insulating material 413 may be formed in the slit 411. For example, the insulating material 413 may be formed to electrically isolate the second input/output pad 405 and the second input/output contact plug 403 disposed in the external pad bonding region PA from the word line bonding region WLBA. An influence of a voltage provided through the second input/output pad 405 on a metal layer disposed on the third substrate 410 in the word line bonding region WLBA may be interrupted by forming the insulating material 413 in the slit 411.

In some embodiments, the first to third input/output pads 205, 405, and 406 may be selectively formed. For example, the memory device 500 may be implemented to include only the first input/output pad 205 disposed on the first substrate 201, only the second input/output pad 405 disposed on the third substrate 410, or only the third input/output pad 406 disposed on the upper insulating layer 401.

In some embodiments, at least one of the second substrate 310 of the first cell region CELL1 or the third substrate 410 of the second cell region CELL2 may be used as a sacrificial substrate and may be completely or partially removed before or after a bonding process. An additional layer may be stacked after the removal of the substrate. For example, the second substrate 310 of the first cell region CELL1 may be removed before or after the peripheral circuit region PERI and the first cell region CELL1 are bonded to each other, and an insulating layer for covering an upper surface of the common source line 320 or a conductive layer for connection may be formed. Similarly, the third substrate 410 of the second cell region CELL2 may be removed before or after the first cell region CELL1 and the second cell region CELL2 are bonded to each other, and the upper insulating layer 401 for covering an upper surface of the common source line 420 or a conductive layer for connection may be formed.

In an embodiment, the memory device 500 described with reference to FIG. 14 may be the memory device 120 or the memory device 1100 described with reference to FIGS. 1 to 13 and may operate based on the method described with reference to FIGS. 1 to 13.

According to the present disclosure, since some of components of a reference generating circuit are disabled in the process of testing a memory device, a magnitude of an external current measured from the memory device decreases relatively. Accordingly, a leakage current occurring in the memory device may be easily detected. This easy detection of the leakage current may mean that the accuracy of a test operation of the memory device is improved.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A memory device comprising:
   a memory cell array;
   a reference generating circuit configured to generate, by using an external power provided from an external device, a plurality of operating voltages, an internal clock signal, and an internal power;

a row decoding circuit connected to the memory cell array through word lines, and configured to control the word lines by using the plurality of operating voltages;

a page buffer circuit connected to the memory cell array through bit lines;

a data input/output circuit connected to the page buffer circuit through data lines;

a buffer circuit configured to receive a command and an address from the external device;

a control logic circuit configured to perform a plurality of logic sequences for controlling the row decoding circuit, the page buffer circuit, the data input/output circuit, and the buffer circuit, based on the internal clock signal and the internal power that is generated using the external power; and a test mode circuit, wherein, when the memory device enters a test mode, the test mode circuit disables at least a part of components of the reference generating circuit such that the plurality of operating voltages and the internal clock signal are not generated and provides an external clock signal received from the external device to the control logic circuit, and wherein, in the test mode, the control logic circuit performs the plurality of logic sequences by using the external clock signal and the internal power.

2. The memory device of claim 1, wherein the reference generating circuit includes:

a voltage generator configured to generate the plurality of operating voltages using the external power;

a clock generator configured to generate the internal clock signal using the external power; and an internal power driver configured to generate the internal power using the external power.

3. The memory device of claim 2, wherein, when the memory device enters the test mode, the test mode circuit is configured to output a disable signal, and wherein each of the voltage generator and the clock generator is disabled based on the disable signal.

4. The memory device of claim 3, wherein the internal power driver includes a standby-mode driver and at least one sub-driver configured to generate the internal power using the external power, and wherein the at least one sub-driver is disabled based on the disable signal.

5. The memory device of claim 1, wherein, when the memory device enters the test mode, the memory cell array, the row decoding circuit, the page buffer circuit, and the data input/output circuit are included in a disable domain.

6. The memory device of claim 1, wherein, in the test mode, the control logic circuit sequentially performs the plurality of logic sequences based on a chip enable signal received from the external device.

7. The memory device of claim 1, wherein the memory device enters the test mode based on a test command received from the external device through the buffer circuit.

8. The memory device of claim 1, wherein a frequency of the external clock signal is lower than or equal to a frequency of the internal clock signal.

9. The memory device of claim 1, wherein the external clock signal is provided from the external device through at least one of a read enable signal, a data signal, a data strobe signal, a write enable signal, and a write protect signal.

10. The memory device of claim 1, wherein the test mode is performed in an electrical die sorting (EDS) process associated with the memory device.

11. The memory device of claim 1, wherein the memory cell array includes a plurality of flash memory cells.

12. The memory device of claim 1, wherein, based on a toggle NAND interface, the buffer circuit receives the command and the address from the external device and exchanges data with the external device.

13. An operation method of a memory device, the operation method comprising:

entering a test mode;

disabling, by using an external power received from an external device, at least a part of components of a reference generating circuit that is configured to generate a plurality of operating voltages, an internal clock signal, and an internal power;

receiving an external clock signal from the external device;

receiving an operation command from the external device; and performing a plurality of logic sequences based on the external clock signal and the internal power, based on the operation command, wherein a frequency of the external clock signal is lower than or equal to a frequency of the internal clock signal.

14. The operation method of claim 13, wherein the memory device communicates with the external device based on a toggle NAND interface.

15. The operation method of claim 14, wherein the external clock signal is received from the external device through at least one of a read enable signal, a data signal, a data strobe signal, a write enable signal, and a write protect signal.

16. The operation method of claim 13, wherein performing the plurality of logic sequences includes:

receiving a chip enable signal from the external device; and sequentially performing the plurality of logic sequences based on the chip enable signal.

17. An operation method of a test device configured to test a memory device, the operation method comprising:

transmitting, to the memory device, a test command for entering a test mode;

transmitting an operation command to the memory device;

transmitting an external power and an external clock signal to the memory device;

measuring an external current of the external power while the memory device performs a plurality of logic sequences corresponding to the operation command;

detecting a leakage current of the memory device based on the external current; and when the leakage current is detected, screening the memory device, wherein a frequency of the external clock signal is lower than or equal to a frequency of an internal clock signal used in the memory device.

18. The operation method of claim 17, wherein the test device communicates with the memory device based on a toggle NAND interface.

19. The operation method of claim 18, wherein the external clock signal is transmitted to the memory device through at least one of a read enable signal, a data signal, a data strobe signal, a write enable signal, and a write protect signal.

20. The operation method of claim 17, wherein measuring the external current includes:
  suspending the external clock signal; and
  measuring the external current of the external power while the external clock signal is suspended.

\* \* \* \* \*